(12) United States Patent
Nelson

(10) Patent No.: US 6,712,361 B2
(45) Date of Patent: Mar. 30, 2004

(54) COMPUTER GAME WITH CARS AND LEVERS

(75) Inventor: Daniel W. Nelson, 848 9$^{th}$ Ave. SW., Rochester, MN (US) 55902

(73) Assignee: Daniel W. Nelson, Rochester, MN (US)

( * ) Notice: Subject to any disclaimer, the term of this patent is extended or adjusted under 35 U.S.C. 154(b) by 0 days.

(21) Appl. No.: 10/192,251

(22) Filed: Jul. 9, 2002

(65) Prior Publication Data

US 2004/0007820 A1 Jan. 15, 2004

(51) Int. Cl.$^7$ ................................................ A63B 71/00
(52) U.S. Cl. .................... 273/441; 273/153; 273/153 S; 463/9; 463/15
(58) Field of Search ................. 273/441, 442, 273/449, 454, 153, 153 S; 463/9, 15

(56) References Cited

U.S. PATENT DOCUMENTS

| | | | | |
|---|---|---|---|---|
| 3,908,989 A | * | 9/1975 | Meyer | 273/441 |
| 4,290,605 A | * | 9/1981 | Matsumoto | 273/110 |
| 5,577,185 A | * | 11/1996 | Tunnell et al. | 345/473 |
| 5,865,680 A | * | 2/1999 | Briggs | 472/128 |

* cited by examiner

*Primary Examiner*—Jessica Harrison
*Assistant Examiner*—Corbett B Coburn
(74) *Attorney, Agent, or Firm*—Nelson R. Capes; Briggs and Morgan, P.A.

(57) ABSTRACT

A mentally challenging game with computer and physical embodiments in which the goal is to move a primary object from its initial location through a system of platforms and levers to a particular destination. Horizontally movable counterweights also traverse this system, serving to raise and lower lever platforms in such a way as to raise and lower the primary object to its destination.

25 Claims, 30 Drawing Sheets figure 2

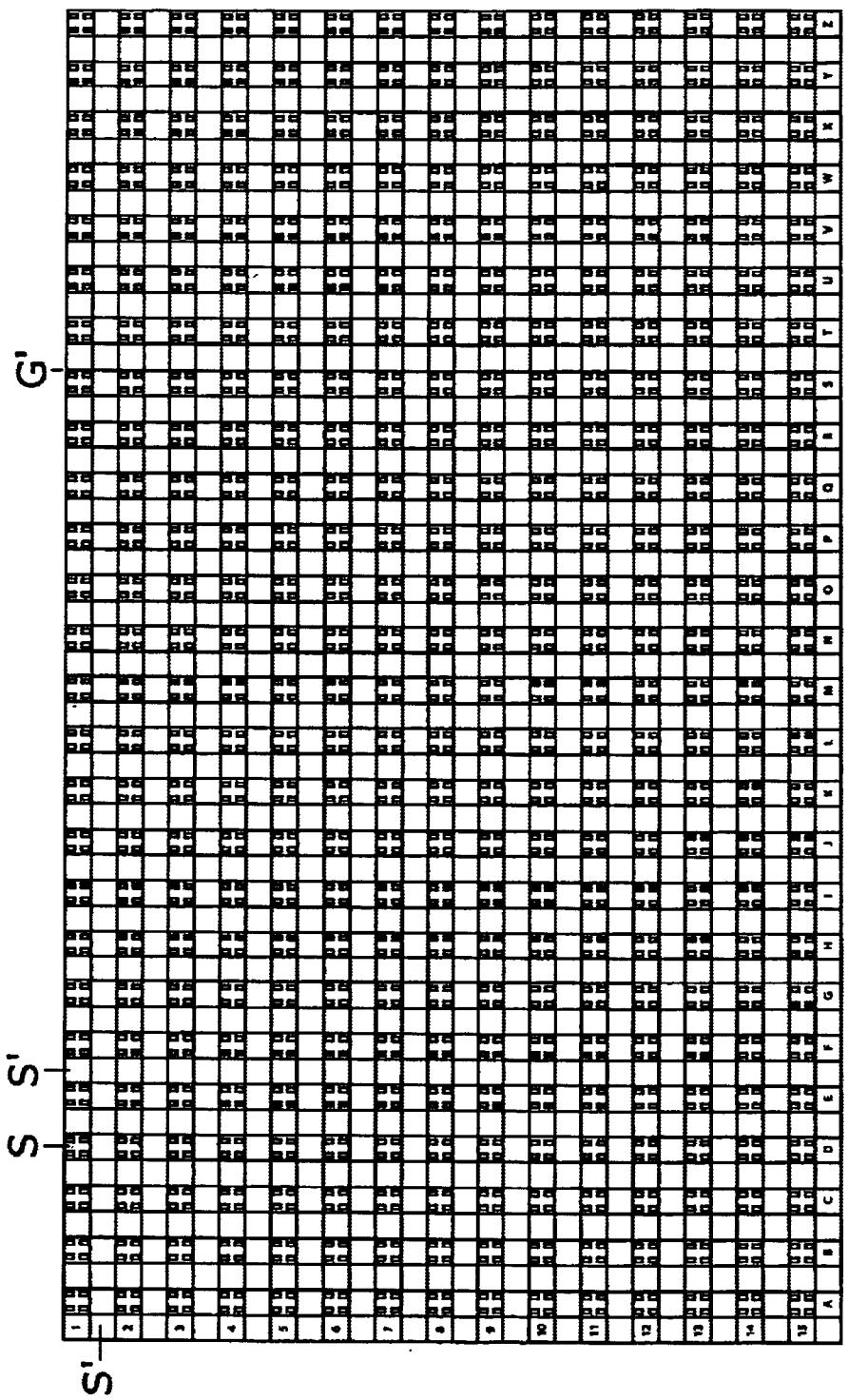

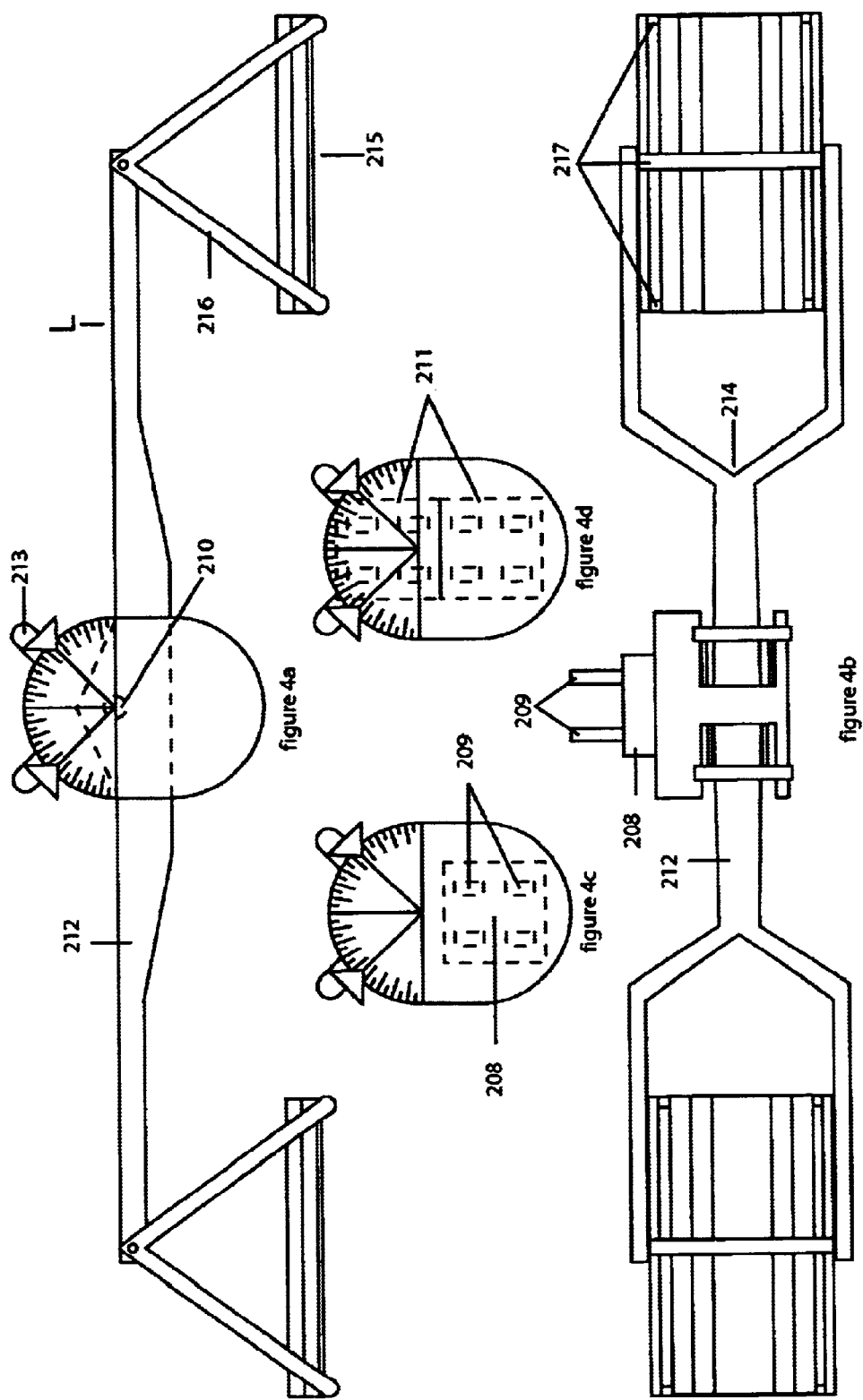

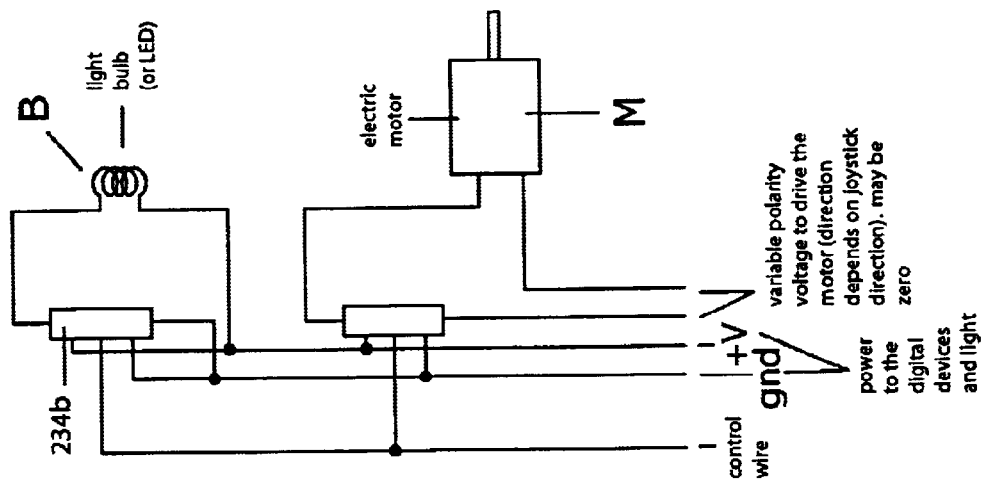
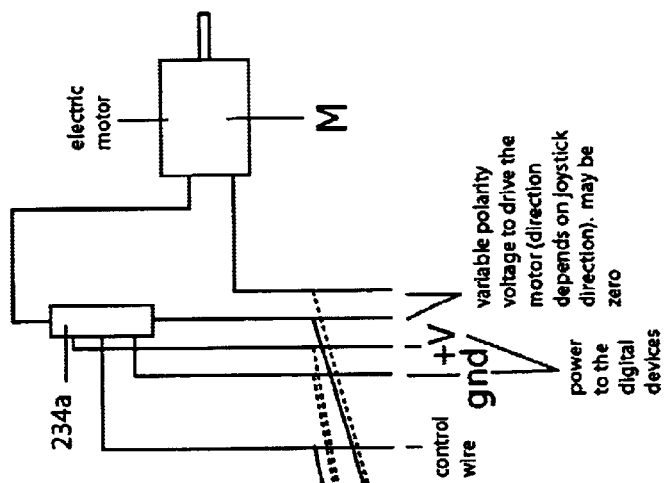
figure 8b
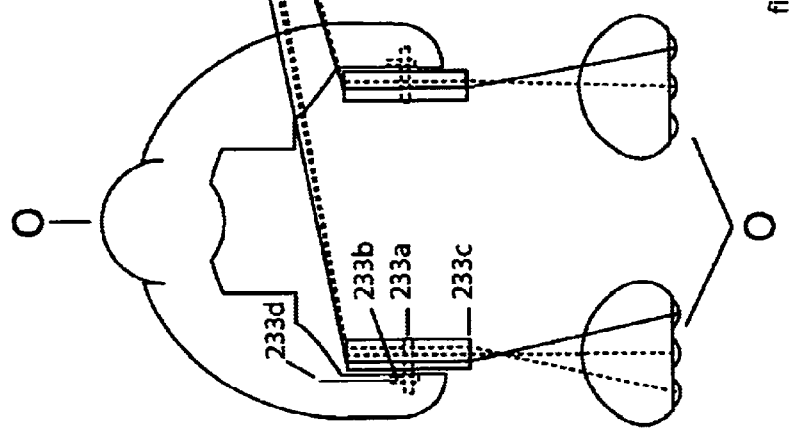
figure 8a the following example is for car number 14, which is activated by a control signal of 1110:

the following example is for car number 1, which is activated by a control signal of 0001:

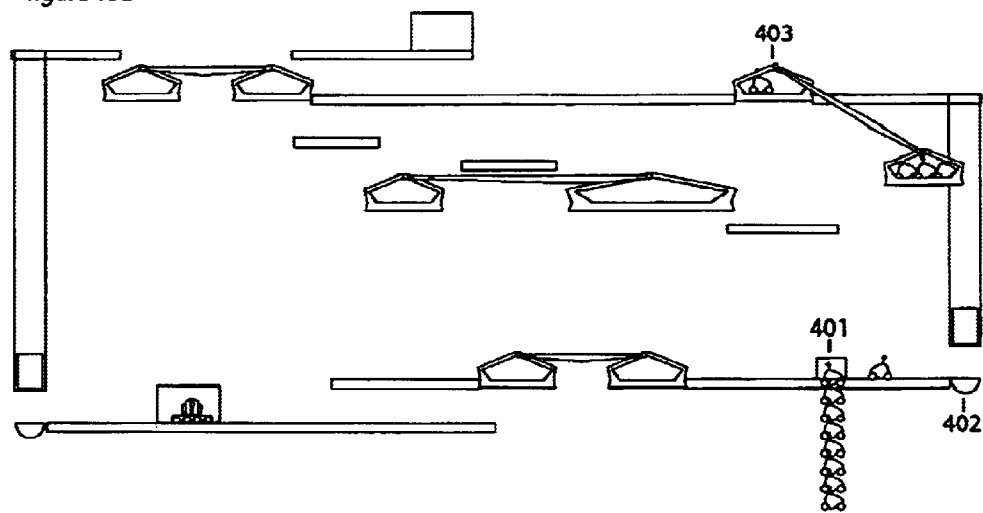
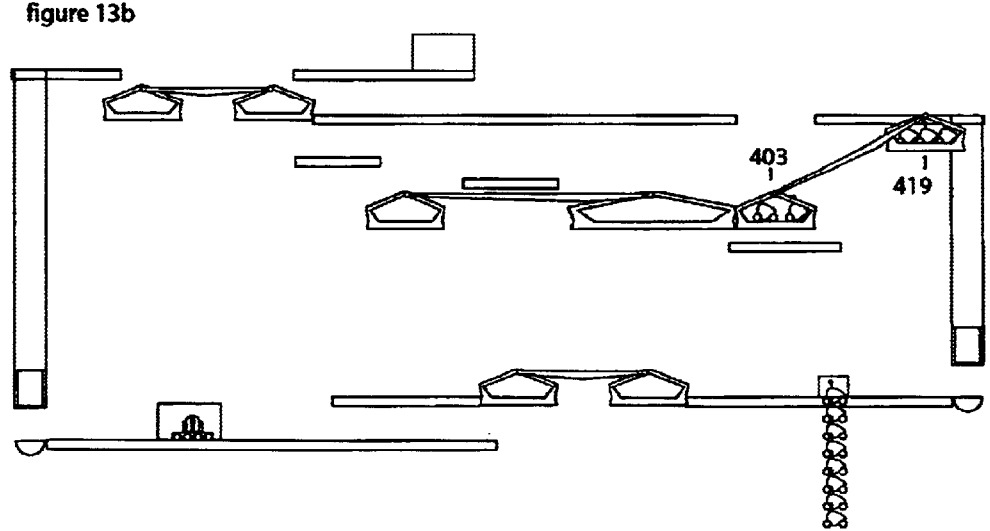

COMPUTER GAME WITH CARS AND LEVERS

BACKGROUND OF THE INVENTION

The present invention relates to a game, the object of which is to move a primary object from an initial location through a system of platforms and levers to a destination. Movable counterweights are used to raise and lower platforms on the levers in such a way as to raise or lower the object to the destination.

SUMMARY OF THE INVENTION

A game, comprising:
(a) a movable object,
(b) an initial location,
(c) a destination, and
(d) a plurality of platforms and levers between the initial location and the destination,
wherein the object of the game is to move the movable object from the initial location to the destination by means of the platforms and the levers.

A principal object and advantage of the game is that the platforms and levers may be set up in a variety of configurations, to provide various levels of challenge to the player.

Another principal object and advantage of the game is that it requires an understanding of the relationship between lever length and torque to successfully plan and execute the various steps necessary to complete the goal.

Another principal object and advantage of the game is that it may be embodied in either a mechanical or an electronic form.

Another principal object and advantage of the game is that in the electronic form it may be played over a network.

BRIEF DESCRIPTION OF THE DRAWINGS

FIG. 2a is a schematic of one embodiment of a grid used with a mechanical version of the present invention.

FIG. 2b is a schematic of another embodiment of a grid used with a mechanical version of the present invention.

FIG. 4a is an elevational view of a lever used with the present invention.

FIG. 4b is a top plan view of a lever used with the present invention.

FIG. 4c is a detail view of the fulcrum area of the lever showing connector blocks in phantom.

FIG. 4d is another embodiment of FIG. 4c.

FIG. 5a is a side elevational view of a counterweight used in the present invention.

FIG. 5b is an end elevational view of the counterweight of FIG. 5a.

FIG. 6b is a second embodiment of FIG. 6a.

FIG. 6c is a top plan view of the embodiment of FIG. 6a.

FIG. 8a is a schematic of an electrified movable object of the present invention.

FIG. 8b is a second embodiment of FIG. 8a (partial view).

FIG. 11b is a side elevational view corresponding to FIG. 11a.

DETAILED DESCRIPTION OF THE PREFERRED EMBODIMENTS

Figure 1:
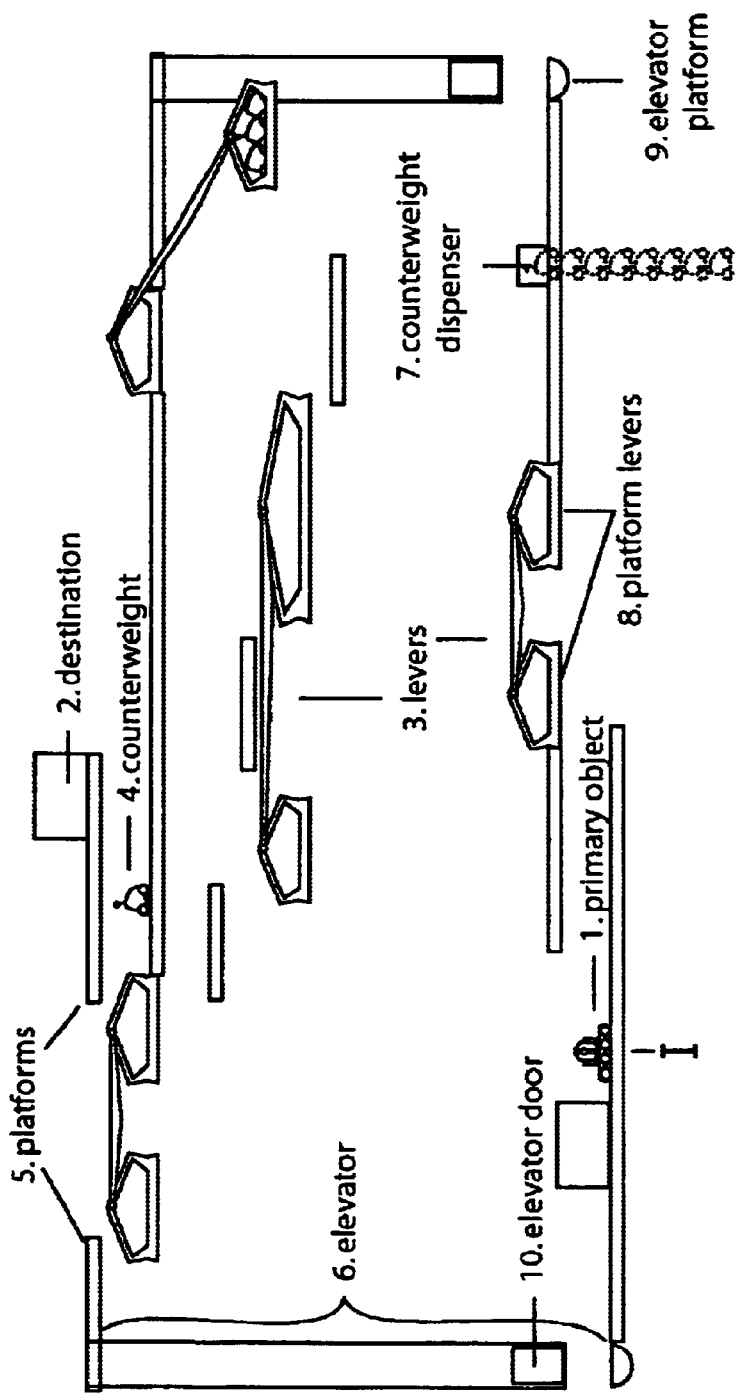
FIG. 1 is a schematic of the present invention.

Components Common to Both the Computer and Physical Game (FIG. 1) The goal is to direct a horizontally moveable object (which we will call the primary object) (1) from an initial location I to a destination location (2) using levers (3), horizontally moveable counterweights (4), and platforms (5). Elevators (6) can lift the counterweights, but cannot lift the primary object.

An understanding of the relationship between lever length and torque is required to successfully plan and execute the steps necessary to complete the goal. This concept can be executed with any configuration of platforms, levers, and elevators that allows for completion of the goal.

Counterweights: Each counterweight (4) is deployed from the same initial location (7). A graphical indicator may be used to show a counterweight to be active or inactive. Once active, a counterweight can be moved left and right.

The counterweights can pass between platforms (5), lever platforms (8), and elevator platforms (9), and are thus transportable throughout a configuration of the invention.

Primary Object: The primary object (1) has a mass twice that of the counterweights. It is controllable in the same way as the counterweights except that it cannot pass onto elevator platforms. The primary object is visually distinguishable from the counterweights.

Counterweights can pass through the primary object.

Elevators (6): Elevator platforms (9) lift counterweights to higher platforms. Elevator doors (10), if included, close when a counterweight boards an elevator platform. A closed elevator door acts as a barrier to the counterweight movement.

Levers: A lever (3) has a platform (8) at the end of both its arms. Its arm lengths can be in different ratios (1:1, 1:2, 1:3, 2:3, and so on). The user determines the number of counterweights to move to or remove from each side in order to achieve the desired lever orientation for lifting or lowering counterweights and the primary object. Some configurations may use dummy counterweights to force an initial non-horizontal orientation of a particular lever. A stop is included on each side of the fulcrum to enable the setting of the maximum angle for each arm of the lever (for instance, the left side may be set to rise to a 30 degree angle, while the right side may be set to rise to a 20 degree angle).

Computer Version of the Game

Figure 15:
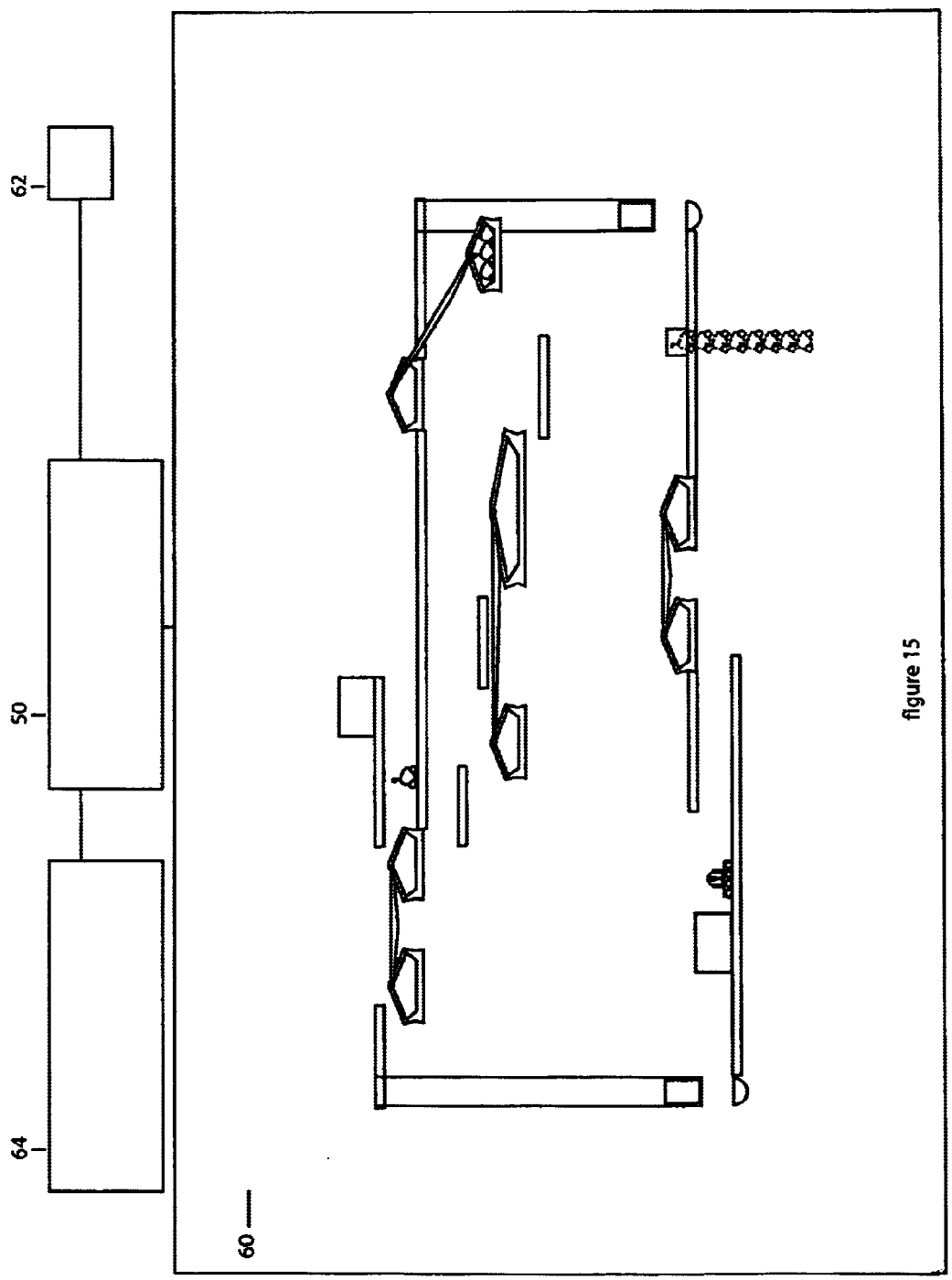
FIG. 15 is a block diagram of a computer-based embodiment of the present invention.

In the electronic embodiment of the game, (FIGS. 1 and 15) the game requires a processor 50 executing a computer program to cause the movable object 1 and counterweights 4 to be displayed adjacent the initial location I, the levers 3, the platforms 5, and the destination 2. The initial location I, destination 2, and platforms 5 are two-dimensional graphic objects displayed fixedly on a display means 60, such as a CRT, monitor, flat panel display, LCD display, or the equivalent. The levers 3, elevator 6, movable object 1, and counterweights 4 are two-dimensional graphic objects displayable at various points on the display means 60.

The primary object and counterweights are designed to simulate cars that follow flat surfaces. They are activated by clicking the graphics that represent them with the mouse 62 and are laterally controlled using an input means 64 such as a keyboard or joystick. Each car can recognize the presence of platforms, walls or doors, and may be adapted to follow curved surfaces (which may act as slides). The counterweights recognize the presence of other counterweights and may impart velocity to them on impact. All counterweights are deployed in the active state. Counterweights can only be deployed if the space immediately in front of the counterweight dispenser (FIG. 1, number 7) is clear of counterweights.

Levers simulate rotational body mechanics. The moment of inertia of a lever increases with arm length and lever platform size. The moment of inertia of a lever also changes with the addition or removal of a car.

Each elevator platform registers the passage of a counterweight onto its surface, causing the door to close and the elevator platform to rise to the top of the elevator. The counterweight is deposited on a platform whose top overlaps the top of the elevator. If another counterweight already occupies this position, then the elevator car continues to move down and up until the space is clear, at which point the counterweight is deposited, the elevator car returns to the bottom, and the elevator door opens.

This game may be played locally or over a network or the internet.

Figure 14:
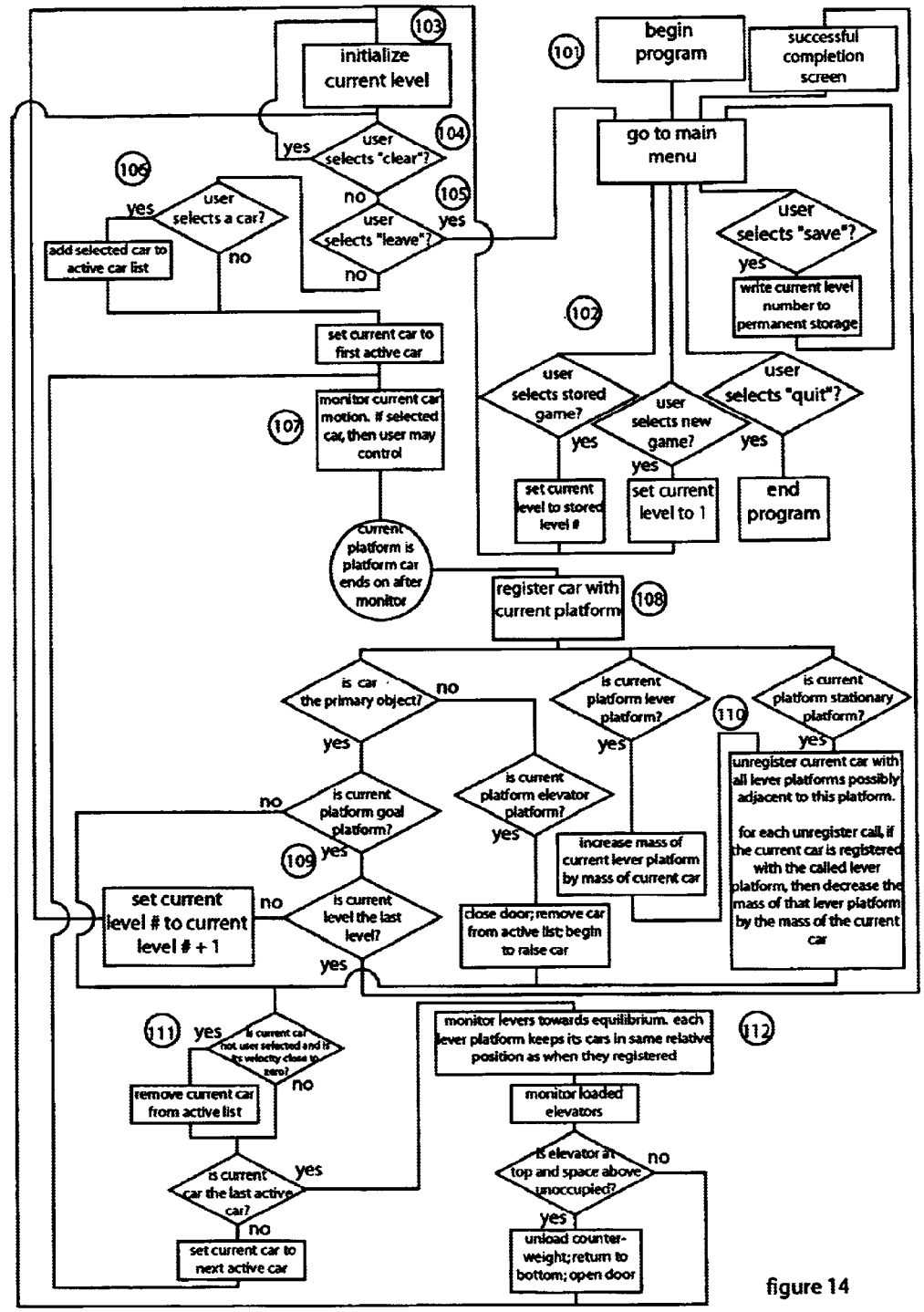
FIG. 14 is a flowchart of a computer-based embodiment of the present invention.

Flowchart Explanation (FIG. 14)

The program begins (101), opening with a menu from which a user can choose to play a new game, load a saved game (in one variation of the program), get help (technical or help in solving; not shown in the flowchart), save current results, and quit.

(102) Beginning a new game starts at level one; beginning a saved game starts from the level at which the user saved the game being resumed. The current level is initialized and begins to execute (103).

Each execution of the playing loop allows users to re-initialize the current level (104), exit to the main menu (105), select a car (106) (which may involve dispensing a counterweight), and control the currently selected car. Every car in a list of active cars is monitored to determine its next location and whether it hits any other cars. An inactive car that is impacted by an active car is added to the active list. User selection of a car to control adds the selected car to the active list.

Each car in the active list is monitored (107) to determine where its velocity will take it, and, in the case of the user selected car, to apply acceleration based on keyboard input.

When the new location of the current car is determined, the car registers itself with the platform on which it sits (108). When a car registers with a platform, the platform responds according to its function and the nature of the car. (109) Destination platforms only take special action when registered by the primary object, this action being to proceed to the next level or to inform the user that the user has successfully completed the last level of the game. When a counterweight registers with an elevator platform, the elevator platform removes that car from the active list, closes the door of that elevator, and begins the process of raising the counterweight.

Lever platforms accept all cars. Registration with a lever platform increases the mass of the platform by the mass of the car being registered. It also notes the position of the car relative to a reference point on the platform, and adds the car to a registration list. (110) Registering with a stationary platform or with a lever platform unregisters the current car with all lever platforms that can at any time be adjacent to the platform. When unregistration with a lever platform is performed for a particular car, the lever platform checks if the car was registered with it, and if so, decreases its mass by the mass of the car and removes it from its registration list.

If a car has negligible velocity after monitoring, and if that car is not selected for control by the user, then that car is removed from the active list (111).

(112) After all active cars are monitored, the levers are monitored, allowing them to move towards equilibrium. Each lever platform maintains the relative position of each car registered with it. Since this registration happens ever time a car has velocity, the cars may be moved across a lever platform as that platform is raised or lowered. The loaded elevator platforms are also monitored. When an elevator platform reaches the top of its shaft, it checks if the space immediately above the shaft is occupied, and if not, unloads its counterweight. If this space is occupied, then the elevator platform continues to move down and up until its load can be released. After unloading, the elevator platform returns to the bottom, and the door of that elevator opens.

This completes one iteration of the game execution code for a given level. This loop is repeated a number of times per second to give the appearance of smooth motion of each moving object.

Mechanical Version of the Game

The physical game may exist in two versions, one that is manipulated manually, the other that uses electric circuits with simple digital logic control circuitry. In the manual version, the cars are pushed through the system, though the elevators may be electrically operated. The electric version allows for each car to be selected and laterally controlled from a control panel.

A grid (G, FIG. 2a), which stands vertically in a stable base, preferably serves as the medium on which each configuration of platforms and levers is formed. The grid G is labeled with numbers along the left and letters along the bottom so that each square S of the grid may be referred to with a letter-number combination (C2, for instance). Each square of the grid preferably has four holes.

Figure 2:
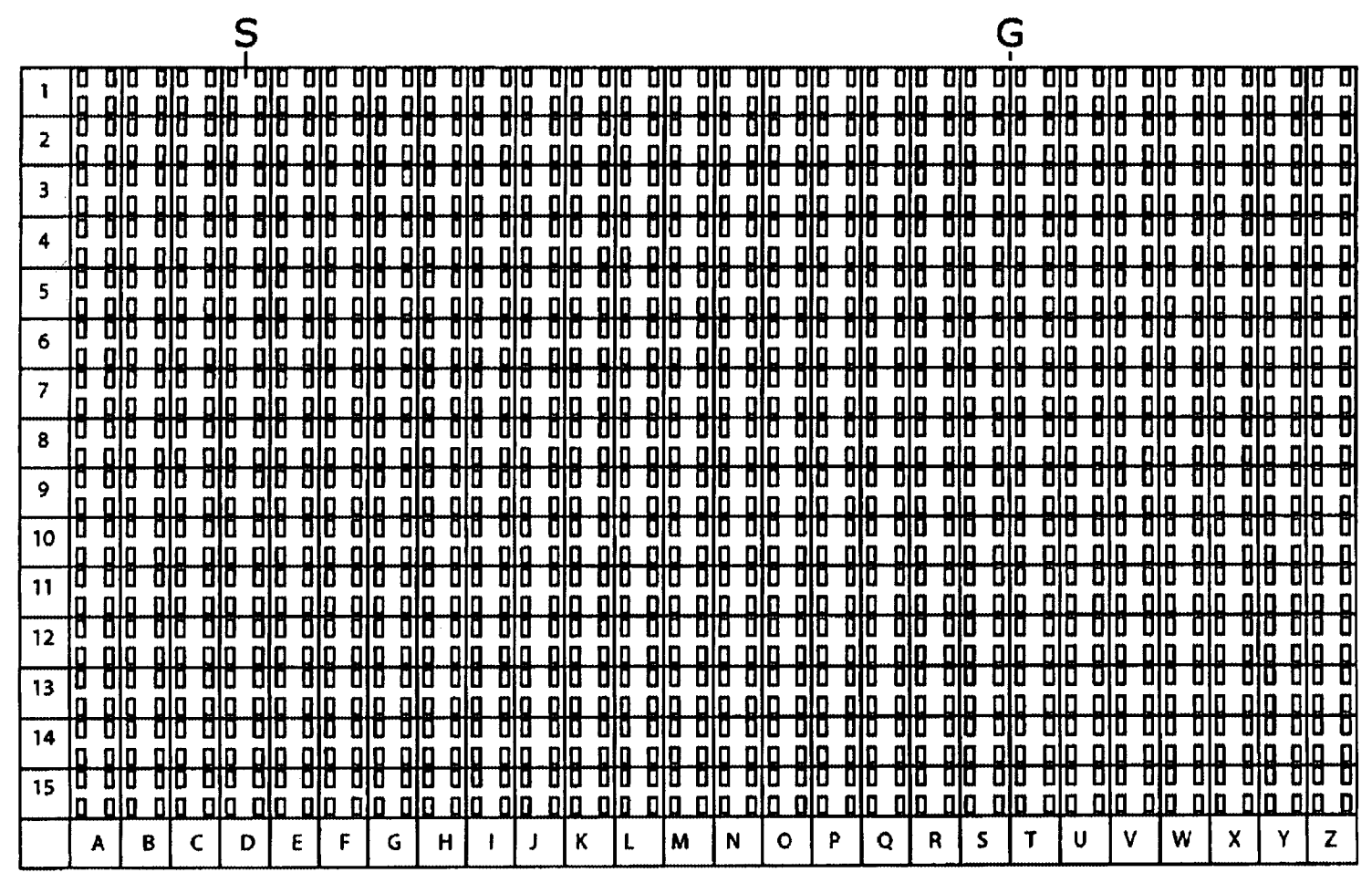

An alternative grid G' includes a row of empty squares S' between each row of holed squares S and includes a column of empty squares S' between each column of holed squares S (FIG. 2b). This may be especially advantageous for keeping down costs of a larger electrified grid.

(FIG. 3) The platforms P, which may be of various lengths, are built onto blocks (201), each of which has four pegs (202) that fit into the four holes S of the grid squares.

A three tiered track (203) keeps the counterweights W and primary object O moving parallel to the platform. The tiers are constructed as from a thin sheet that is bent into the desired shape, leaving it concave beneath. The wheels of the counterweights straddle the topmost part of the track (204), riding on the middle part (205). The wheels of the primary object straddle the middle part (205), riding on the lowest part (206). It is important to keep the depth (207) of the material that forms the tiers as shallow as possible so that arcing lever platforms avoid hitting the stable platforms as they swing into their top or bottom positions without leaving too wide a gap between the platform edges.

Levers L (FIG. 4) are affixed to the grid through a block (208) with four pegs (209) similar to those supporting the platforms. Two blocks stacked one on top of the other may be desirable for added strength (211). The fulcrum housing is built onto this block. The fulcrum housing surrounds the fulcrum (210) on which the lever arm (212) will turn. A stop (213) on each side may be set to a particular angle. When one side of the arm swings up, the stop on that side will determine the maximum angle to which that side of the arm may rotate upward.

The arm forks (214) part way out, spreading to each side of the lever platform (215) so that cars can be loaded and unloaded from either side of a lever platform without being blocked by the arm when the platform is raised above the fulcrum housing.

The lever platforms are suspended below each end of the arm. They are fashioned similarly to the platform tracks, with the addition of a triangular brace (216) that attaches to the outer sides of the track. Three bars (217) connect the two triangular braces (216), one at each vertex. The top bar serves as a pivot that passes through the forked end of the arm and allows the lever platform to swing freely and remain parallel to the ground as the lever arm swings through any angle. A weight may be attached underneath the middle of each lever platform to minimize platform tilting when car mass is not centered on the platform.

Each platform should be long enough to hold enough counterweights so that when the other side is loaded with the primary object, a full load of counterweights will raise the primary object to the highest position attainable by the lever, plus enough space to move away from the top stable platform so that the counterweights and primary object do not impact the stable platform as they arc up to or down from the platform.

If lever lengths are not equal, then the mass of the lever platform on the shorter side must be increased so that the arm remains level when both platforms are empty. This may be accomplished by increasing the size of the platform or by affixing masses to the underside of the platform.

With a fixed grid, it may prove unworkable to match the top or bottom position of a lever platform with both the horizontal and vertical position of the end of a stable platform that it is supposed to reach. To rectify this, the holes in the grid may be wider than the pegs on the blocks (or the four holes may be replaced with two horizontal holes, one on top of the other, each spanning the width of the grid square), with the pegs being slightly closer together (or replaced by two horizontal rectangles, one on top of the other, both horizontally narrower than the holes in the grid squares), allowing for horizontal shifting on a finer granularity than on a per square basis.

Figure 3A:
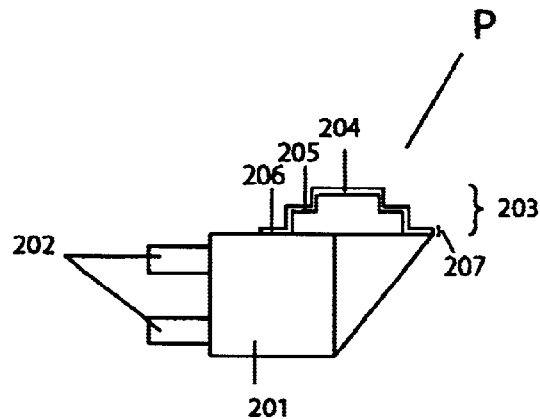
FIG. 3a is a side elevational view of a platform used with the present invention.
Figure 3B:
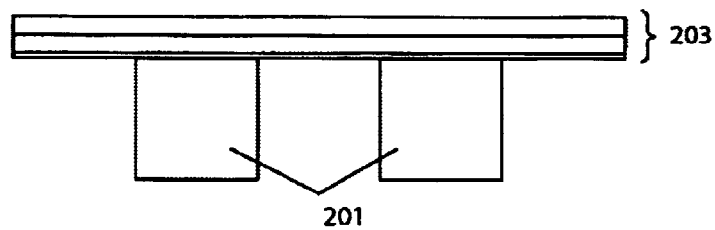
FIG. 3b is a front elevational view of a platform used with the present invention.
Figure 3C:
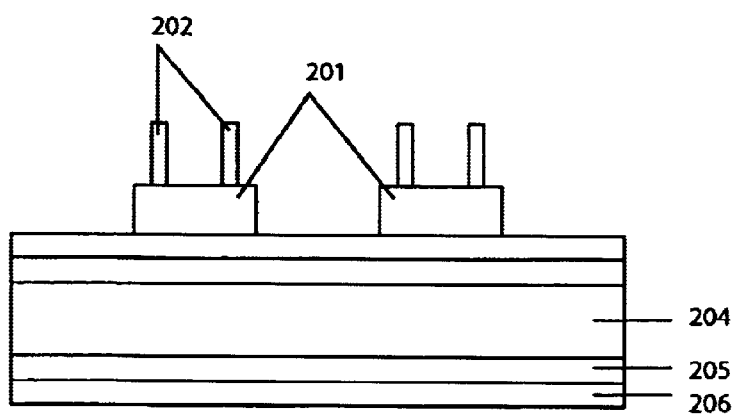
FIG. 3c is a top plan view of a platform used with the present invention.
Figures 5A, 5B:
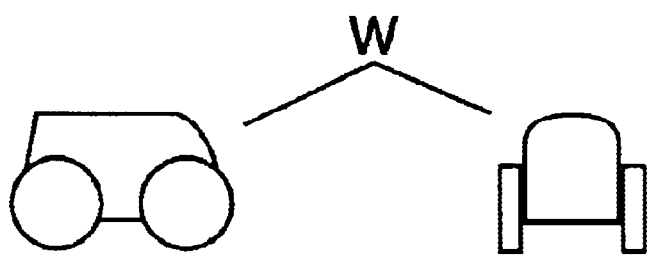

The counterweights W (FIG. 5a) are preferably small cars with four wheels. The wheels span the top, center portion of the platform track (FIG. 3, number 204).

Figure 5C:
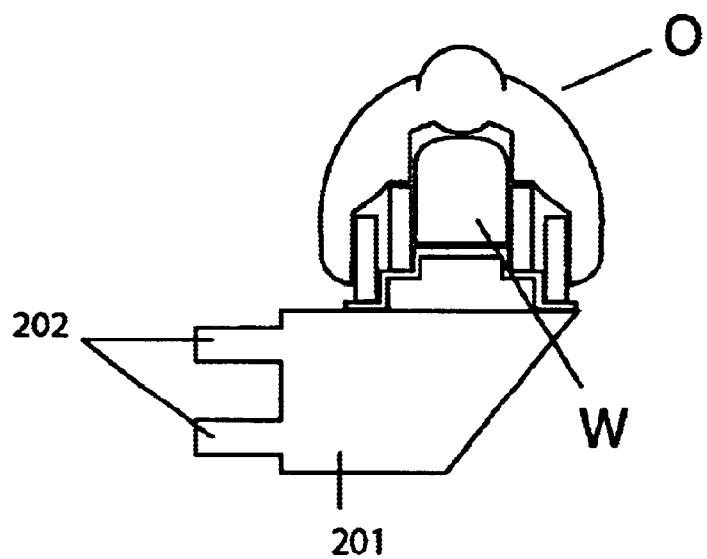
FIG. 5c is a side elevational view of a platform of the present invention with a counterweight and movable object thereon.
Figures 5D, 5E:
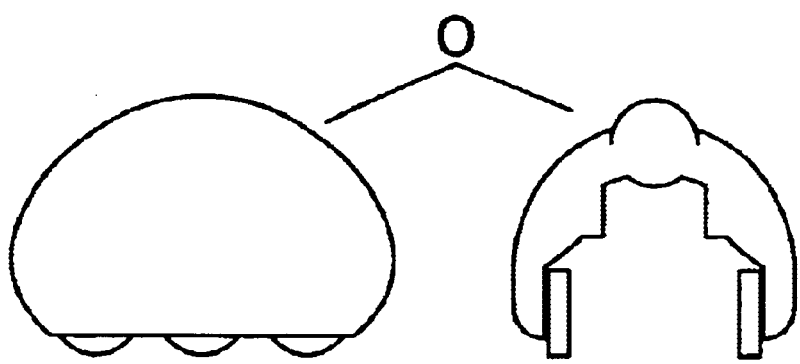
FIG. 5d is a side elevational view of a movable object used in the present invention.
FIG. 5e is an end elevational view of the movable object of FIG. 5d.

The primary object O (FIG. 5d) is a car with at least six wheels. Its mass is exactly twice that of a counterweight. The primary object is preferably designed so that counterweights can pass beneath it (FIG. 5c) as it rides on the lower portion of a platform track (FIG. 3, number 206).

Note: all the cars should be durable enough to endure many falls without breakage.

Figure 6A:
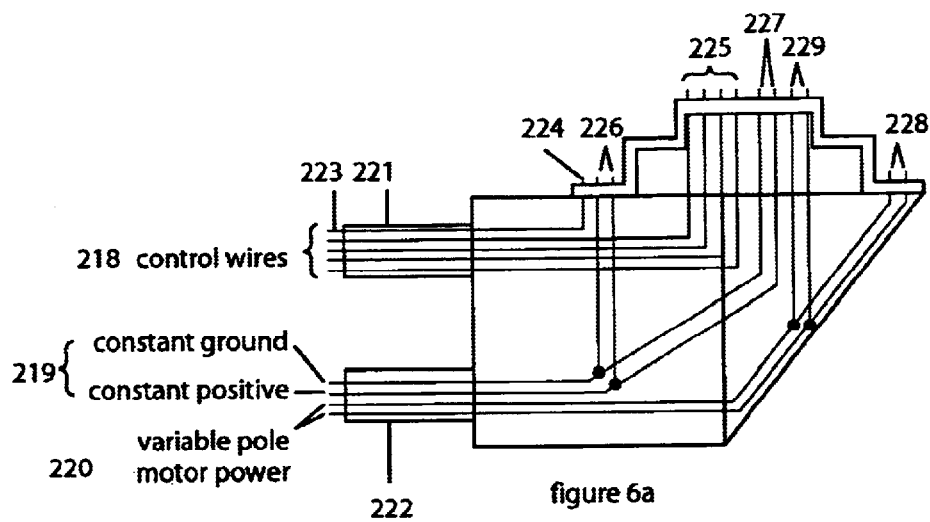
FIG. 6a is a side elevational view of an electrified platform used with the present invention, with electrical connections shown interiorly.
Figure 6C:
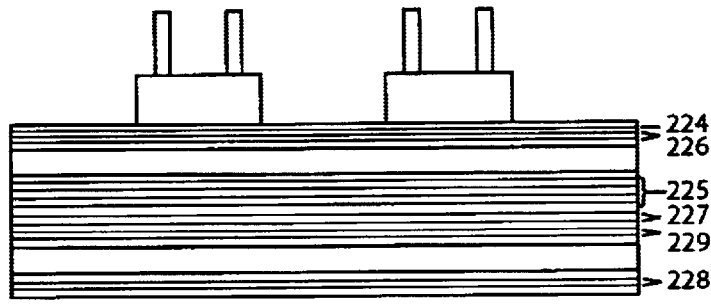
Figure 6B:
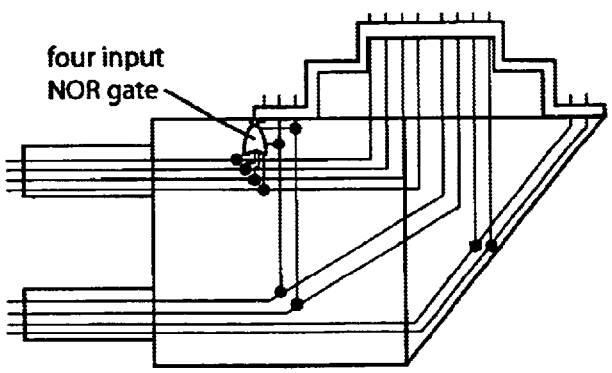

(FIGS. 6a–6c) Each of the components of the game may be electrified as described in the following sections, which described a preferred method of electrification. However, any other suitable mechanism of electrification may be used.

Electrification will make use of a bus of nine wires (or eight, as explained below). The topmost five wires (218) carry the control code to make a single car responsive to the drive voltage. The next two wires (219) are ground and positive voltage, providing power to digital logic devices, components (such as elevators) that need constant power, and optionally, a light to indicate which car is selected. The final two wires (220) provide power to the motor of the selected car. The polarity will determine the direction the car will travel, and the voltage will be zero when no car is being driven.

Electrified Platforms (FIG. 6a) The control wires enter a platform through one of the top pegs supporting the platform (221), and the remaining four wires enter the platform through one of the lower pegs (222).

The first control wire (223) is designated for the primary object. It connects to a narrow, metal strip (224) running the length of the track closest to the grid. A positive voltage on this wire will turn the primary object 'on'. The first wire may be removed elsewhere in the invention if a four input NOR gate (see FIG. 6b) is included in each platform, with its inputs coming from the four remaining control wires and its output leading to the primary object control strip (224).

The next four control wires carry a binary signal that can select for one of up to fifteen counterweights (fifteen because four bits gives 16 possibilities, and zero—all wires off—is the signal when the primary control object is on). Each of these wires is connected to one of four metal strips (225) running the length of the platform through its middle section, with higher order bits closer to the grid than lower order bits.

The constant ground and constant positive wires (219) are made available to both the primary object and counterweights by connecting them to metal strips running the length of the track closest to the grid (226) and farther from the grid than the control wires in the middle (227) respectively.

The motor drive circuit is made available to the primary object and the counterweights by connecting its two wires to two wires in the track farthest from the grid (228) and in the middle (229) just outside the constant voltage wire respectively.

Electrified Levers

The lever platforms are electrified similarly to the stable platforms. The control signal and power are transferred from the grid into the fulcrum housing through the support pegs via a nine (or eight; see 'Electrified Platforms) wire cable or bus. The cable passes into the arm and down each side to the triangular brace (FIG. 4, number 216), across the underside support bars (FIG. 4, number 217), and then connects to metal strips as in the stable platforms.

Electrified Grid

Figure 7A:
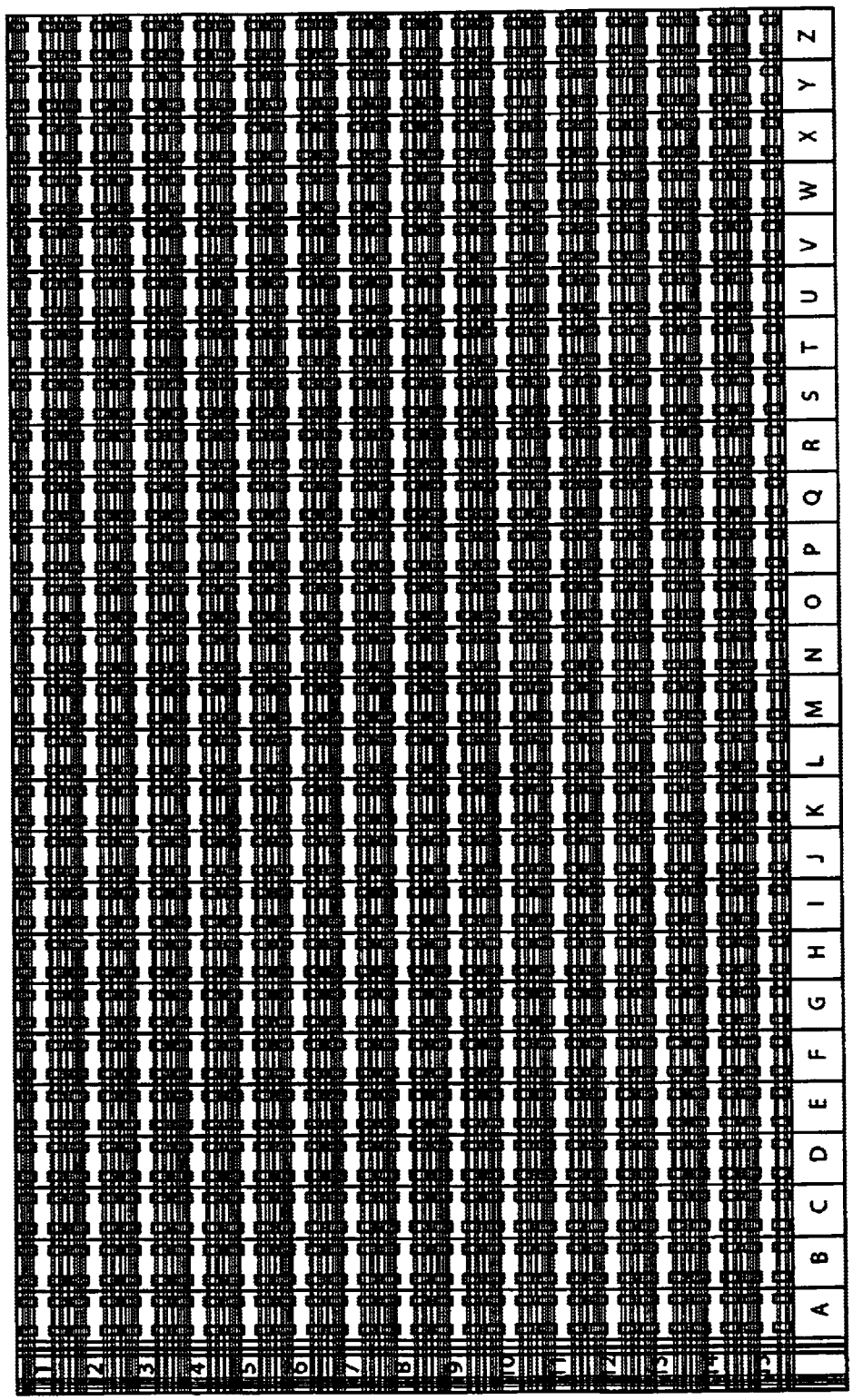
FIG. 7a is a schematic of an electrified grid used with the present invention.
Figure 7B:
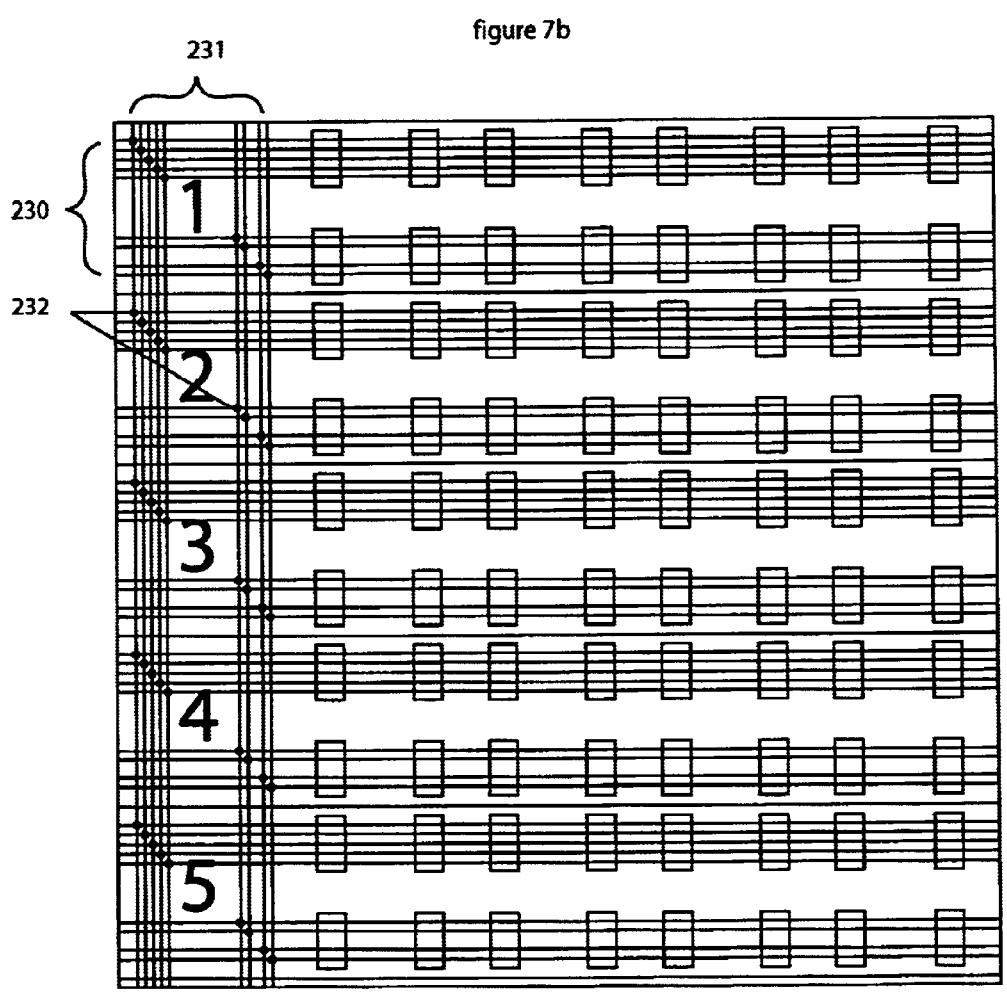
FIG. 7b is similar to FIG. 7a, but also showing internal wiring.

One set of horizontal metal strips (FIG. 7b, number 230) corresponding to the above described control and power wires spans each horizontal row of the grid. Vertical strips span the height of the grid in one of the columns (FIG. 7b, number 231) (here, the leftmost, though this is arbitrary). Each vertical strip is connected to the same horizontal strip in every row of the grid, with left-to-right order in the vertical strips corresponding to top-to-bottom order in the horizontal strips (FIG. 7b, number 232). (For example, the leftmost vertical strip is connected to the topmost horizontal strip in each row of the grid.)

Electrified Primary Object

The primary object needs connections to five wires (FIG. 8a) (control, ground, constant voltage, and the two motor power wires). Since its middle is raised and may be passed under by counterweights, we use five of its six wheels as pickups, the connections being carried through the axles (233a) and metal contacts (233b) rubbing against the axles inside the car body. If the metal strips running through the platform track protrude up out of the track surface, then each wheel of the primary object has three grooves (233c), one for each strip (the other track only has two strips, but the same wheel design may be used here as well). One of these grooves on each wheel is lined with metal that is connected to the axle via a wire or some other connector.

Inside the car body, a wire (233d) carries the control signal from the axle contact (233b) to a digitally controlled, bi-directional switch (234a). An electric motor M in series with the bi-directional switch forms a circuit with the motor power wires when the control wire has a positive voltage. The polarity of the motor drive wires determines the direction the motor turns. If there is no voltage differential between the drive wires, then the motor remains idle. The motor drives a series of screws and gears that eventually leads to one drive axle on each side of the car.

If a light is included as an indicator that the primary object is selected (FIG. 8b), then an additional digitally controlled switch (234b) (not necessarily bi-directional, may simply be a transistor) is included. When the control wire has a positive voltage, the circuit from the constant ground and voltage wires through the light bulb/diode indicator B is closed, illuminating the light B.

Electrified Counterweights

Each car should be numbered on one side (the side that is to face away from the grid, enforcing correct orientation on the track) to enable the user to distinguish between the cars and to properly select the desired counterweight using the control panel.

Figure 9C:
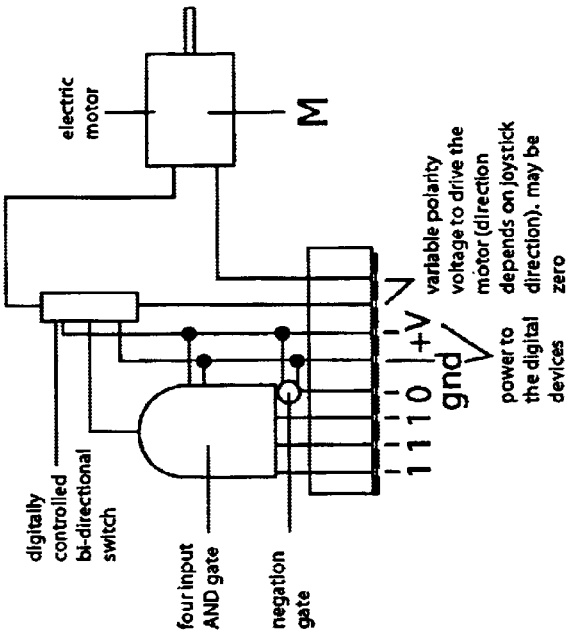
FIG. 9c is a second embodiment of FIG. 9b.
Figure 9A:
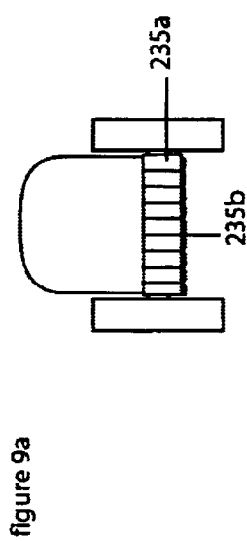
FIG. 9a is a schematic of an electrified counterweight of the present invention.

(FIG. 9a) The middle of each counterweight rides immediately above the center of the platform tracks. An block of non-conducting material (235a) hangs down from the center of the car, with a groove to match each metal strip in the platform center. A metal contact (235b) in each groove carries the voltage from the strips into the car body.

Once inside the body, the four control wires proceed to digital logic circuitry that determines whether this car is selected. To reduce the amount of circuitry, we use one of two types of four-input gates, negating a maximum of two inputs. This method may be replaced by a more efficient or cheaper method.

Figure 9B:
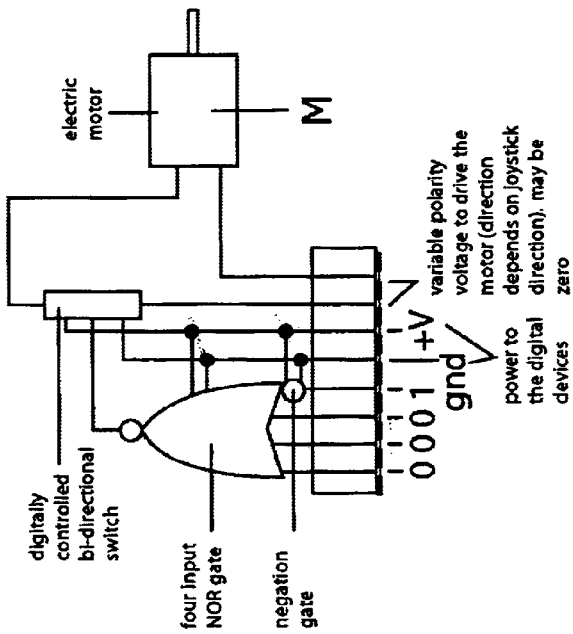
FIG. 9b is an electrical schematic of selection logic for a counterweight.

(FIG. 9b) For numbers whose binary representation includes more zeros than ones or equal zeros and ones (0: 0000, 1: 0001, 2: 0010, 3: 0011, 4: 0100, 5: 0101, 6: 0110, 8: 1000, 9: 1001, 10: 1010, and 12: 1100), negate all ones before connecting to the inputs of a four input NOR gate (a NOR gate outputs positive voltage if and only if all of its inputs have no voltage) and connect the output from the NOR gate into a digitally controlled, bi-directional switch.

(FIG. 9c) For numbers whose binary representation includes more ones than zeros (7: 0111, 11: 1011, 13: 1101, 14: 1110, and 15: 1111), negate all zeros before connecting to the inputs of a four input AND gate (an AND gate outputs positive if and only if all of its inputs have positive voltage) and connect the output from the AND gate into a digitally controlled, bi-directional switch.

When turned on, the bi-directional switch completes the circuit that runs through the electric motor and the motor power wires.

All the digital circuitry is powered by the constant voltage and constant ground.

If a light is desired to signal the selection of a particular counterweight, then the output of the digital circuitry may proceed to another digital switch as described under 'Electrified Primary Object'.

Figure 10:
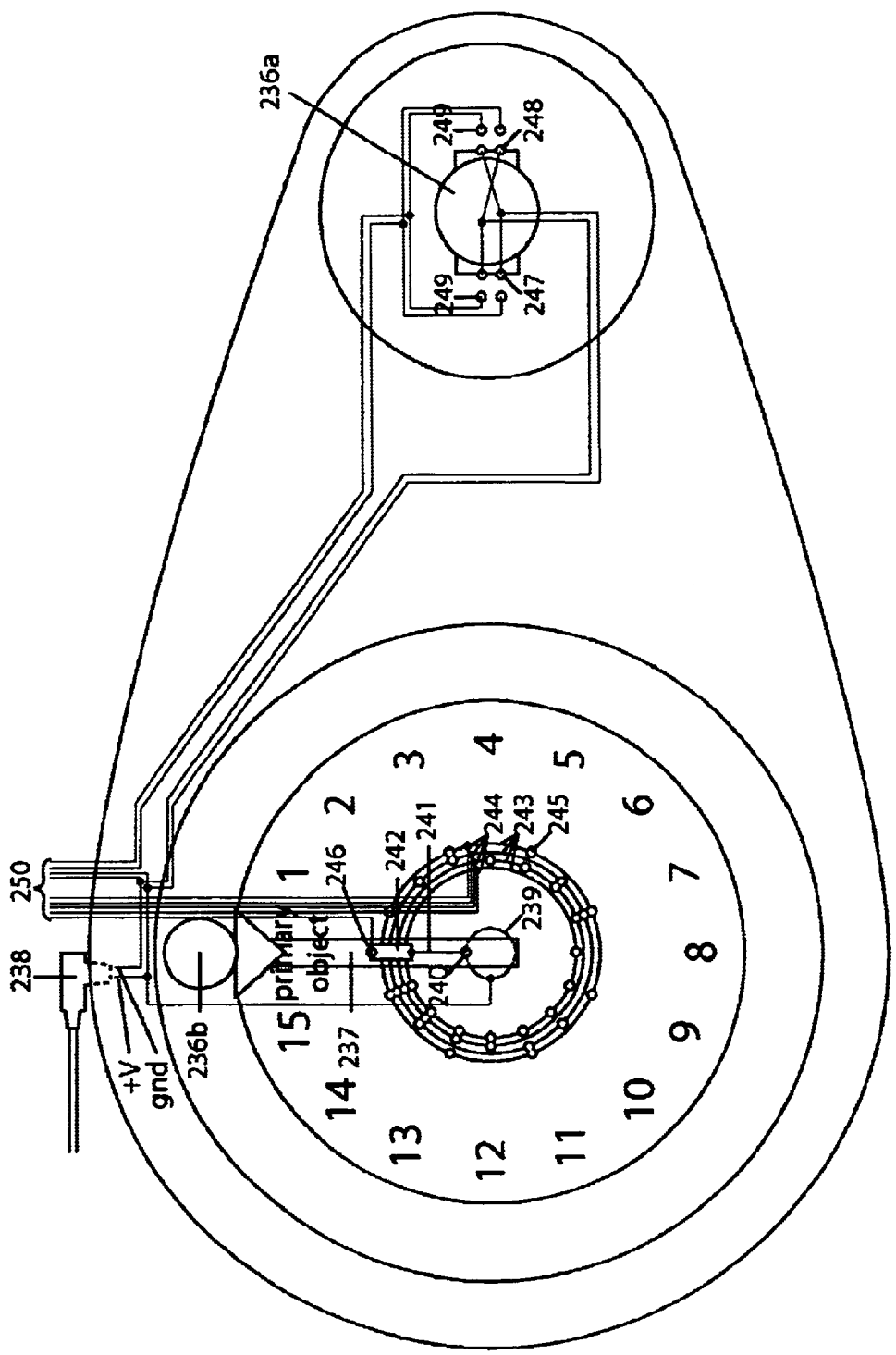
FIG. 10 is a schematic of a control panel used with the present invention.

Electric Game Control Panel (FIG. 10) The control panel consists of a car selector and a joystick (236a). The selector is a handle (236b) attached to an arm (237) that rotates around a dial with numbers 1 through 15 indicating fifteen counterweights and an identifier for the primary object. The joystick can be moved left and right or can stand straight up.

Direct current from an adapter (238) provides power to the control panel. A wire carries positive voltage from the adapter to a metal ring (239) at the center of the selector dial. A metal contact (240) on the selector arm (237) transfers voltage to a wire (241) that connects to a metal strip (242) farther out on the arm.

Four concentric circles of metal (243) encircle the center of the dial. These are connected (244) to the four control wires, with the inner circles being attached to the higher order control wires, and the outer circles being attached to lower order control wires (i.e., the innermost circle corresponds to the $2^3$ wire, and the outermost circle corresponds to the $2^0$ wire). A raised contact (245) on one of these circles will connect with the positive voltage metal strip (242) on the arm when the arm is at an orientation that covers the contact. For each number on the dial, from 0 to 15, attach a raised contact to each wire circle that should be 'on' (to produce the binary representation of that number on the control wires) along the vector connecting the dial center with the number on the dial. If a control wire is designated for the primary object (see 'Electrified Platforms'), then this wire is attached to an isolated, raised contact (246) just above the outermost wire circle in the middle of the dial.

Rotating the dial to a particular number sets the correct binary code on the control wires to activate the car of that number.

Wires also connect the positive voltage and ground to the joystick (236a). Inside the joystick, the wires connect to two metal contacts on the left (247), and crossover to connect to two contacts on the right (248) (thus, the polarity when the joystick is pushed left is opposite that of when it is pushed right). When the joystick is pushed left or right, its contacts touch one of two other sets of contacts (249) connected to the motor drive wires. A voltage differential is thereby applied to the motor drive wires that will power the motor of the selected car.

The control wires, constant ground and voltage wires, and motor drive wires reconvene (250) and lead to the grid in a cable or bus.

Figure 11A:
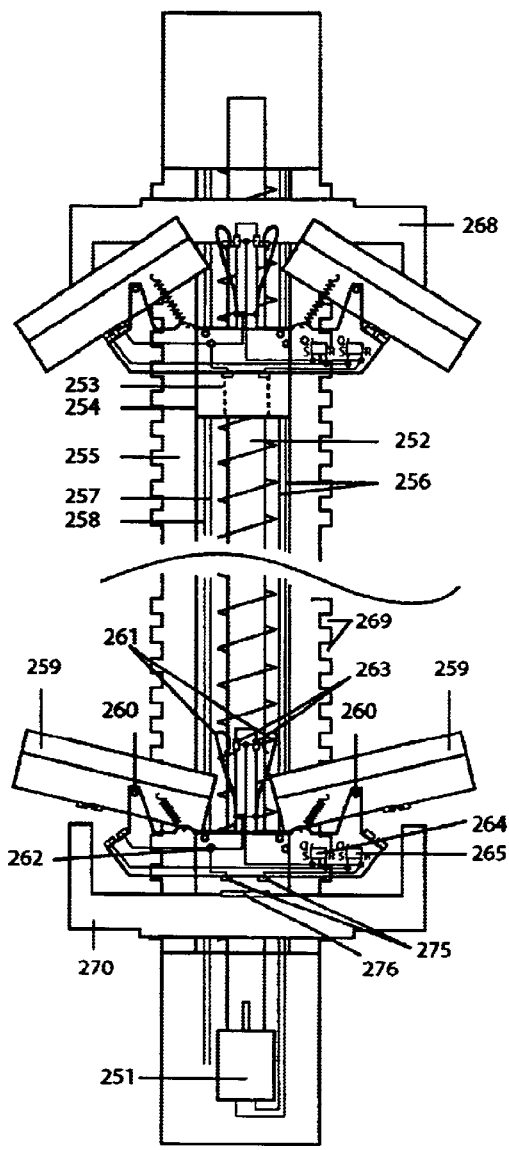
FIG. 11a is a front elevational view of an electrified elevator used with the present invention.

Elevators (FIG. 11a) The elevator may be electrified in both physical versions of the game. In the manual version of the game, it may run on batteries, but in the electrified version, it is powered by the constant ground and constant voltage from the grid.

The elevator spans the entire height of the grid, plugging into the bottom and top rows. An electric motor (251) is connected to a vertical, threaded rod (252) by a series of gears (not shown). The rod passes through a threaded hole (253) in the part of the elevator car (254) that is contained by the elevator shaft (255). As the rod turns, the car presses laterally against the elevator shaft and, unable to turn, moves vertically. The motor terminals are connected to two metal strips (256) that run the height of the elevator shaft. Two similar metal strips are connected to the constant positive (257) and constant ground (258) in the grid.

The elevator car has two unwired platforms (259) (i.e., they do not allow electric control of the counterweights), each of which swivels around an axle (260). In their rest position, the platforms are tilted inward, towards a metal switch (261) on each side of the center of the elevator car. The base of each of these switches is connected by a wire to a contact (262) that brushes the vertical metal strip carrying the positive voltage (257).

Figure 11B:
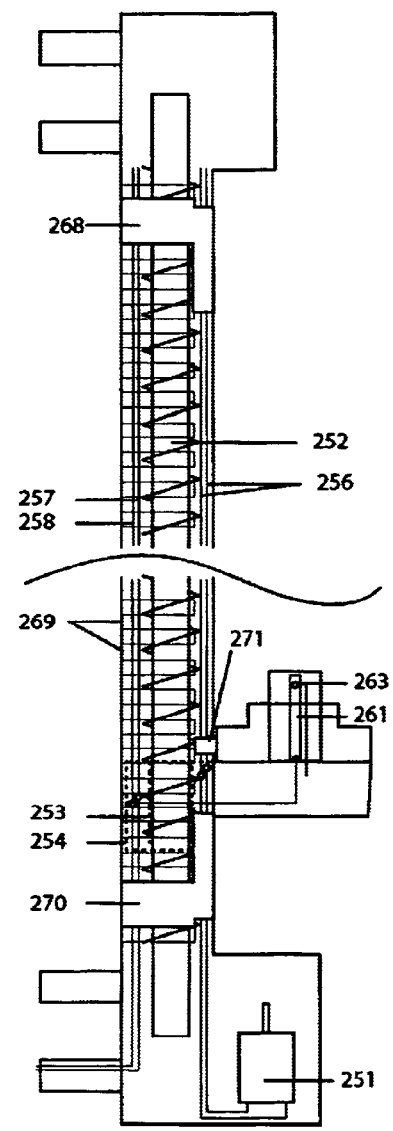
Figure 11C:
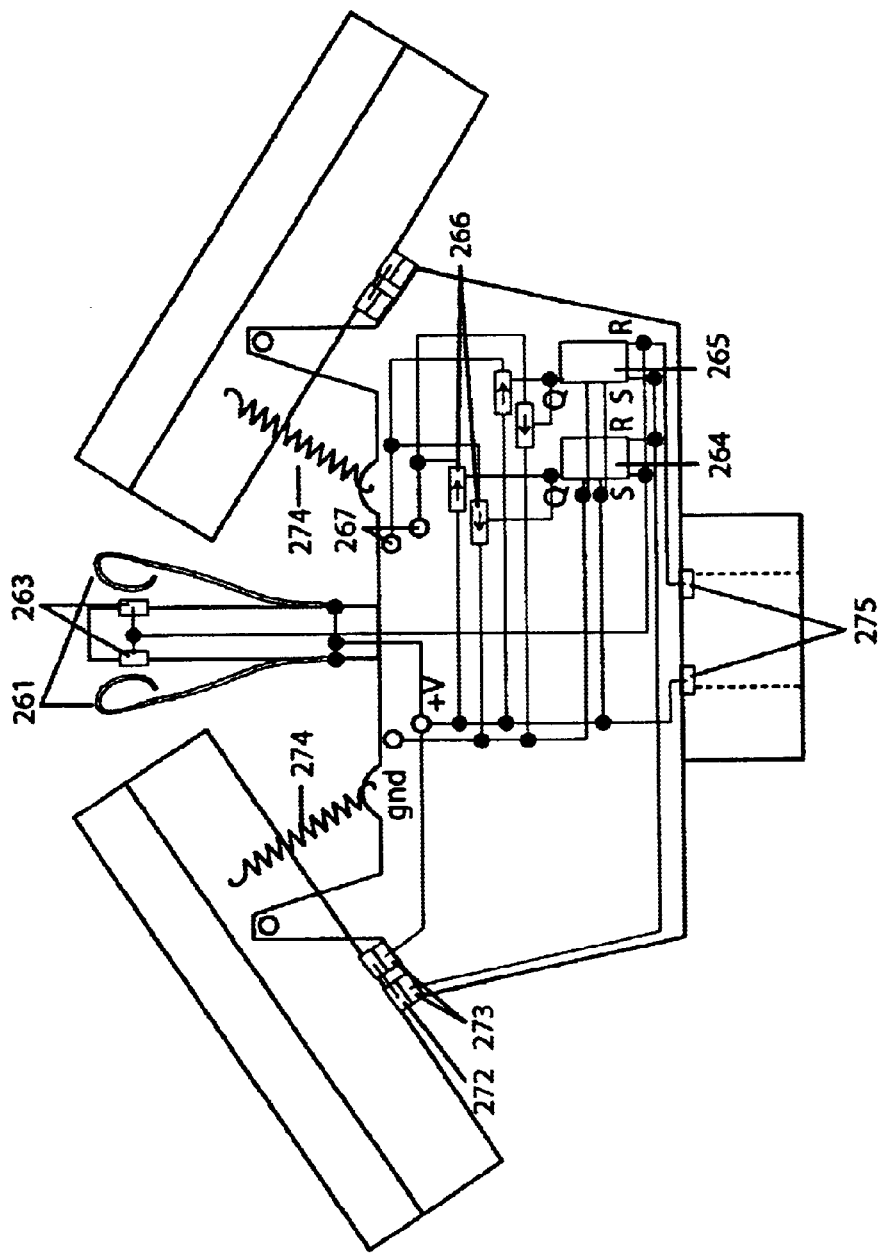
FIG. 11c is a detailed schematic of a portion of the elevator of FIG. 11a, showing internal wiring.

A counterweight that moves onto one of the tilted platforms slides against the metal switch on that side (261), pressing it against a contact (263) (note: this requires the platforms to be slippery or the counterweights to be free-rolling when their motors are not powered). This contact leads to the "set" input (designated by "S") of one RS latch (64) (an RS latch is a logical device that remembers the last state to which is was set or reset) and to the "reset" input (designated by "R") of a second RS latch (65). The RS latches are powered by the constant voltage and constant ground (see FIG. 11b). The "Q" output (which is the remembered value of the last setting/resetting of the latch; in this case, "set") of the RS latch that is set by the closing of the central switch (261) is connected to the control line of two digital switches (266) (which may be as simple as transistors installed so that current can flow in the direction indicated by the arrows) in series with the two contacts that carry the constant voltage and with two contacts (267) that brush the metal strips (256) leading to the motor terminals.

Once this RS latch has been set by the counterweight, it remains set until its reset input has a positive voltage. The two digital switches (266) remain open, driving the motor, until this RS latch is reset. The motor is installed so that the polarity in the circuit resulting from this RS latch being set causes the elevator car to rise.

A bracket (268) with arms facing down is affixed at the highest desired location for the elevator car. Grooves (269) in the side of the elevator shaft correspond to grooves in the bracket, allowing the bracket to be detached by sliding away from the grid, and reattached at the desired location by sliding it onto the shaft above the elevator car with its arms facing down. A similar bracket (270) is affixed below the elevator car with its arms facing up.

As the car reaches the top bracket, the downward facing arms contact a tab (271) on the grid side of each platform (outside of platform axle (260) with respect to the middle of the elevator car). The upward motion of the car pushes these tabs down, rotating the platforms away from the center of the car. As the platforms begin to tilt away from the center of the elevator car, the counterweight slides off of the platform (onto another platform that has been correctly aligned).

The outer end of the platform is eventually pushed to its lowest position, at which point a metal strip (272) connects two contacts (273) on the base of the elevator car. One of these contacts is connected to the constant voltage, the other leads to the "reset" terminal of RS latch 264 and to the "set" terminal of RS latch 265. The outputs of RS latch 265 are connected to digital switches similarly to what is described above, but with the strips (256) leading to the motor having the opposite polarity of that described above. This causes the elevator to move downward until RS latch 265 is reset.

As the car moves away from the upper bracket, springs (274) pull the inner side of each platform down so that the platforms return to their inward slanting orientation.

RS latch 265 is reset either by a counterweight closing switch 261 or when two contacts (275) on the bottom of the elevator car base touch a metal strip (276) on the upward facing part of the lower bracket (270). One of the contacts on the bottom of the elevator car is connected to the constant positive voltage, the other is connected to the reset terminal of RS latch 265. When RS latch 265 is reset, the digitally controlled switches to which its "Q" output is connected turn off. The motor stops turning and the elevator car comes to rest.

Upward facing arms on the lower bracket may help the platforms to remain tilted inward when a counterweight begins to load.

Figure 12:
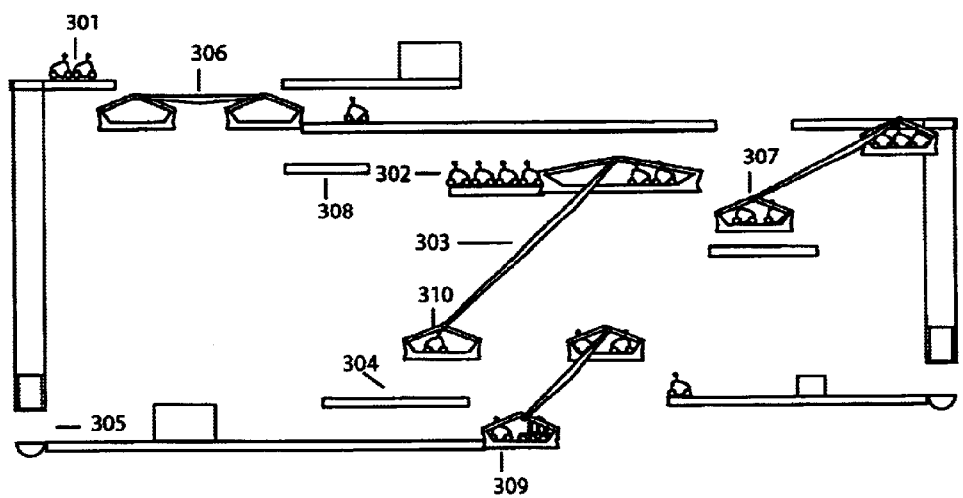
FIG. 12 is a schematic showing the starting positions of counterweights and levers in one configuration of the present invention.

Operation of the Game (FIG. 12) A good means of solving a configuration of the invention is to backtrack from the destination. This tells us where we will need to store counterweights in preparation for raising the primary object. These principles are here applied to illustrate how they can be used to solve a particular configuration of the invention.

In this example, we see that the final lifting of the primary object to the destination location using lever (306) will require three counterweights at the top of the elevator on the left side of the screen (301) (the lengths of the sides of this lever correspond to a 1:1 ratio, and the ratio of the primary object mass to the counterweight mass is 2:1). We also note that we will need 6 counterweights to raise the primary object with the long, central lever (303) (the lengths of the sides of this lever are a 3:1 ratio), for which we will need to store four counterweights at location (302) (four counterweights because one counterweight on the left of (303) can raise two counterweights on the right of (303), and six on the right will perfectly balance the primary object on the left so that a seventh may be placed on it from lever platform (307), raising the primary object to location (308).

We also notice that in the process of loading this store (302) of counterweights, we will necessarily move counterweights to the lower middle of the screen (304). The bottom of the elevator on the left of the screen (305) can be easily reached from this lower middle location (304); therefore, the loading of the central store (302) can occur during the process of moving counterweights to top of the elevator on the left side of the screen (301).

We also note that since the primary object is heavier than the counterweights, it is better to move the counterweights to their necessary positions before moving the primary object, except in cases where the counterweights are necessary for weighing down a lever platform so the primary object can be loaded (as in (309) and (310)).

Figure 13C:
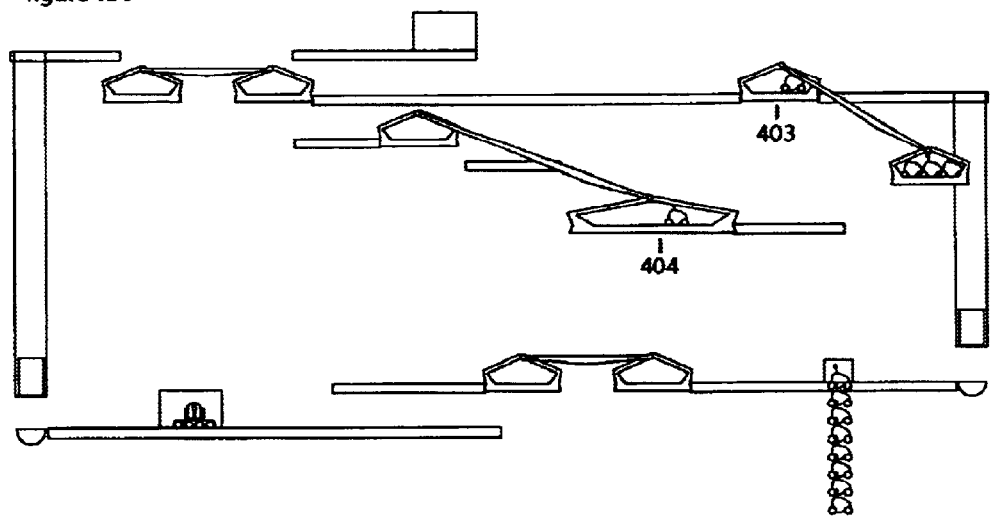
FIGS. 13a–13y are schematics showing the changes in the configuration of the present invention as the game progresses.

Thus, the following steps may be taken to solve this particular configuration:

(FIG. 13a) Dispense a counterweight (401), move it to the elevator at right (402) and then to the first lever platform to the left (403).

(FIG. 13b) Repeat step 'a' so that lever platform 403 falls to its lowest position with two counterweights overbalancing the three counterweights on lever platform 419 (the ratio of the length of the lever platform 419 arm to the length of the lever platform 419 arm is 2:1).

(FIG. 13c) Remove one counterweight from lever platform 403 to lever platform 404 so that lever platform 404 falls to its lowest position and lever platform 403 returns to its highest position.

Figure 13D:
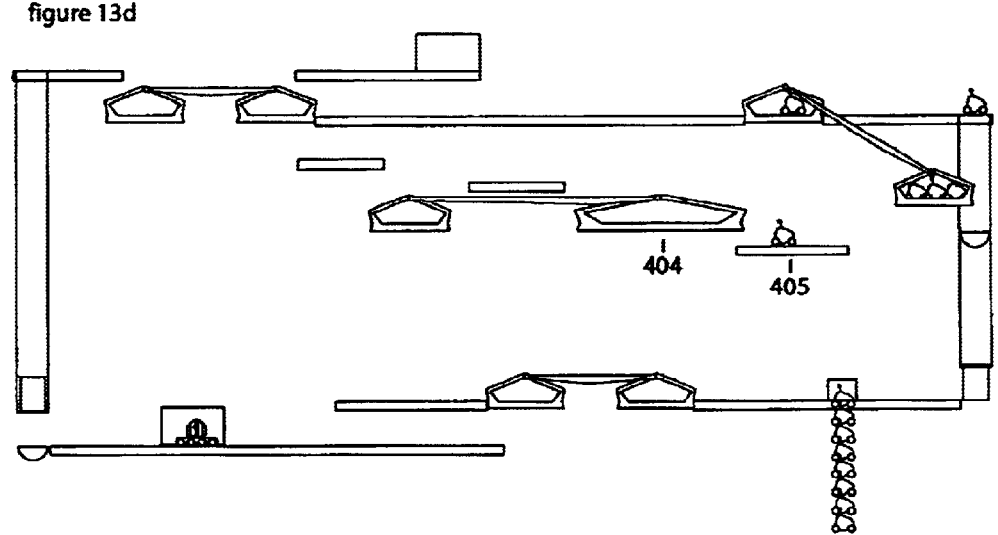

(FIG. 13d) Remove the counterweight from lever platform 404 to platform 405 so that lever platform 404 returns to its middle position.

Figure 13E:
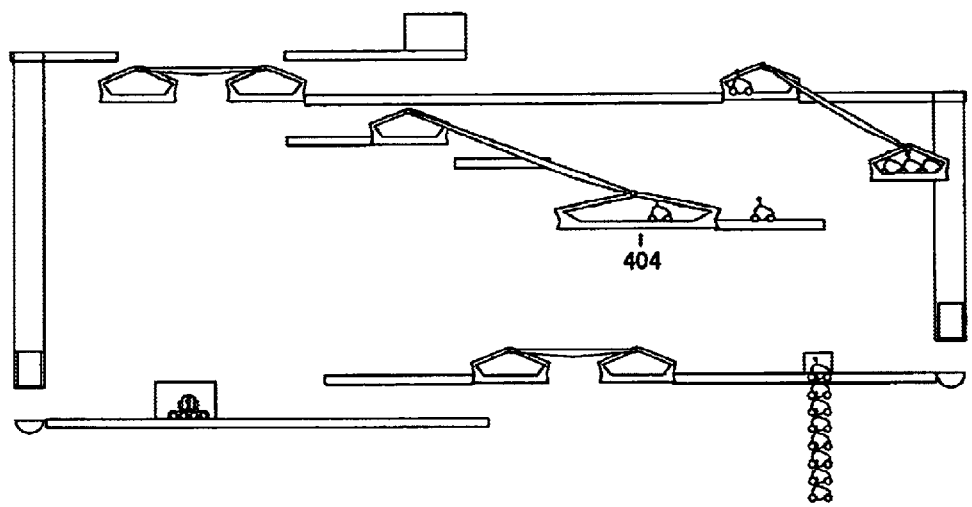

(FIG. 13e) Repeat step 'a' again so that lever platform 404 again falls to its lowest position.

Figure 13F:
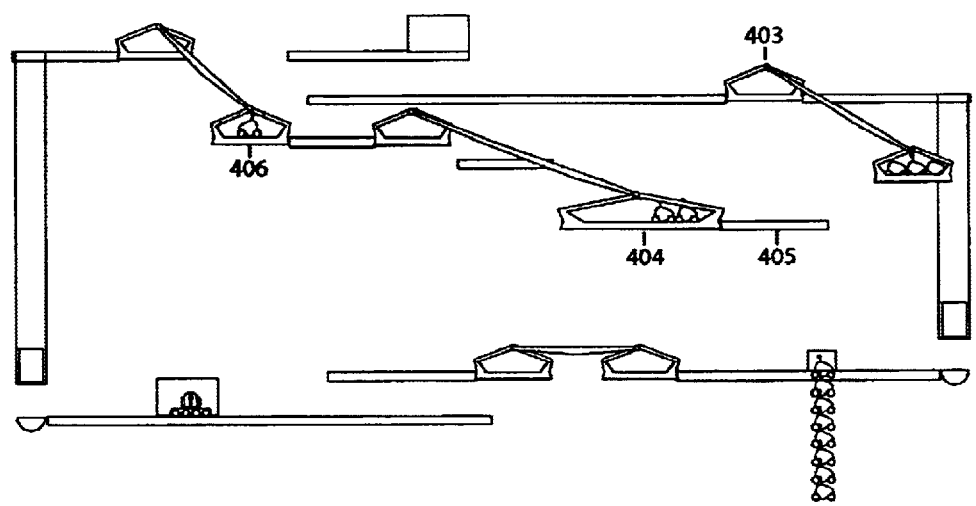

(FIG. 13f) Move the counterweight from platform 405 to lever platform 404 and move the counterweight from lever platform 403 all the way left to lever platform 406, causing lever platform 406 to fall to its lowest position.

Figure 13G:
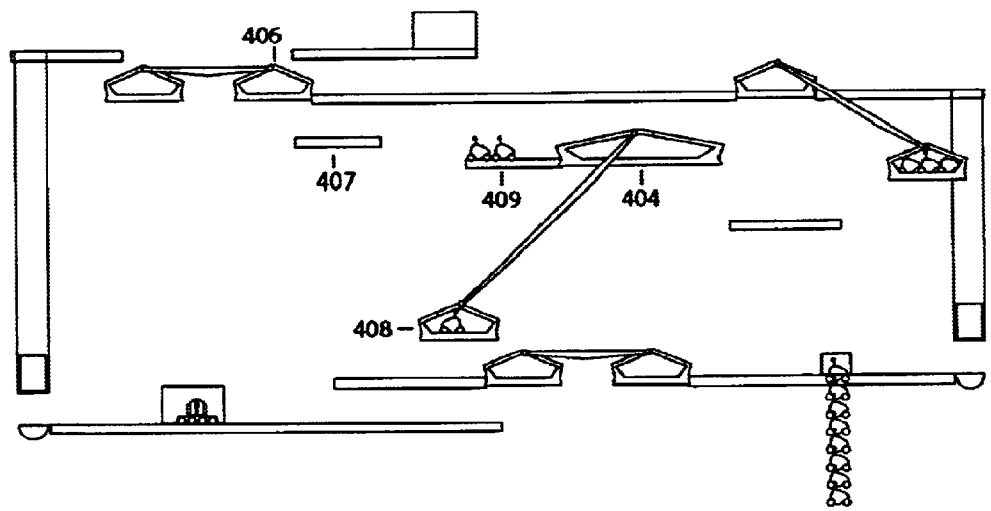

(FIG. 13g) Move the counterweight from lever platform 406 across platform 407 to lever platform 408 so that lever platform 408 falls to its lowest position and lever platform 404 rises to its highest position. Remove the two counterweights from lever platform 404 to platform 409.

Figure 13H:
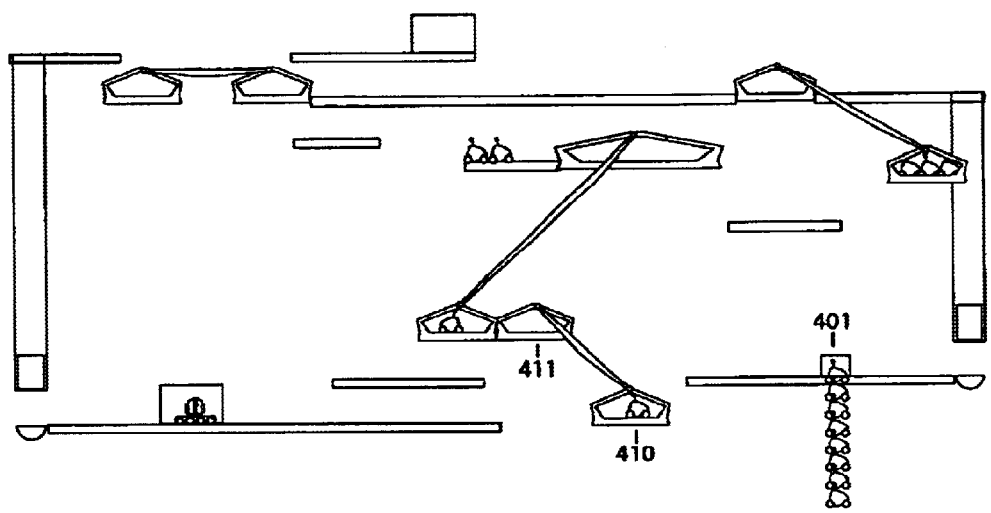

(FIG. 13h) Dispense a counterweight (401) and move it to lever platform 410, causing lever platform 410 to fall to its lowest position and lever platform 411 to rise to its highest position.

Figure 13I:
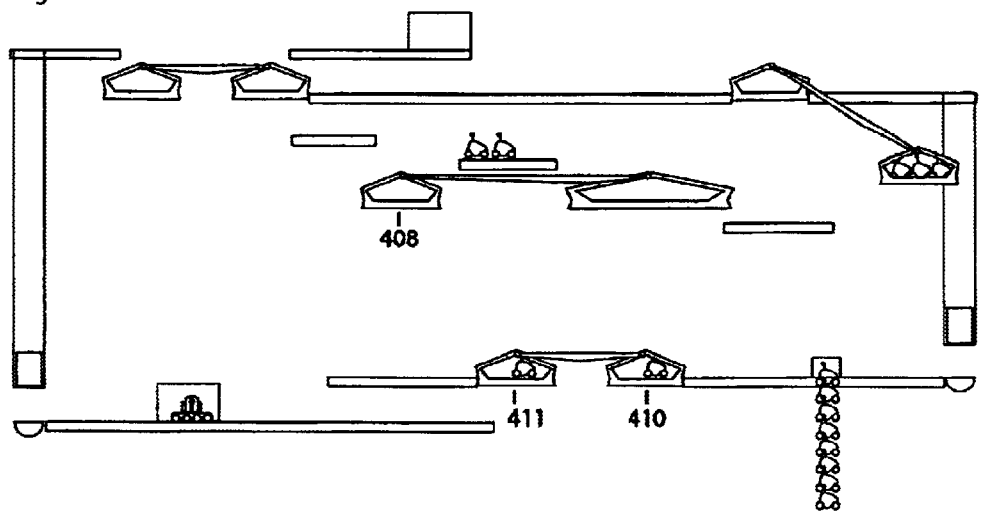

(FIG. 13i) Remove the counterweight from lever platform 408 to lever platform 411, causing lever platforms 410 and 411 to return to their middle positions.

Figure 13J:
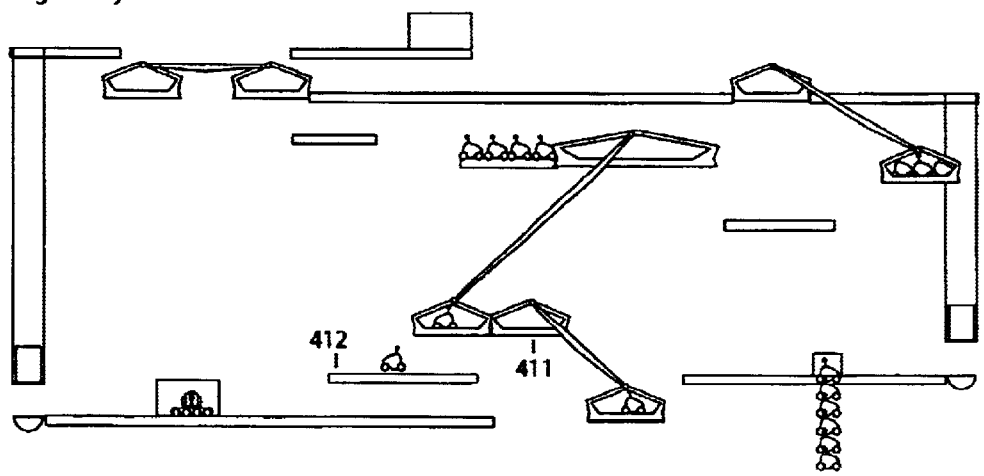

(FIG. 13j) Remove the counterweight from lever platform 411 to platform 412, causing lever platform 411 to rise to its highest position. Repeat steps a through g.

Figure 13K:
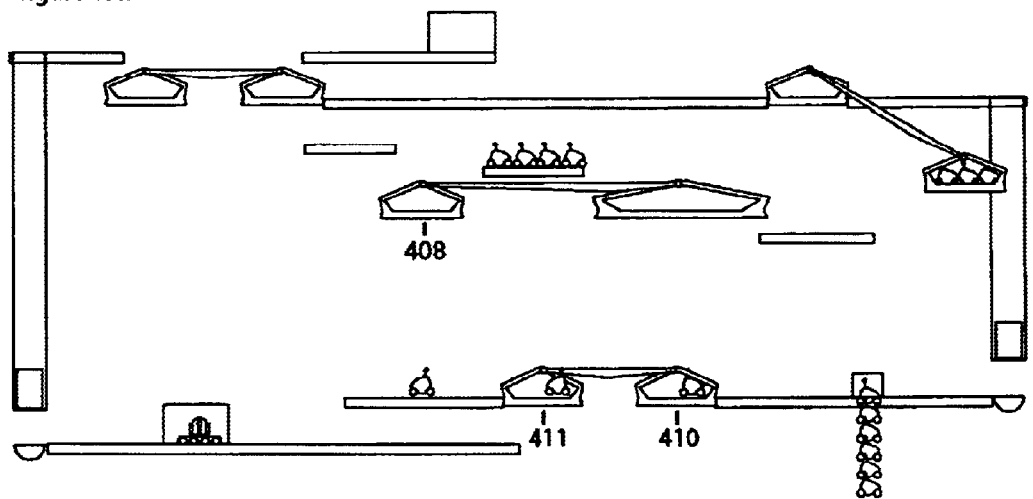

(FIG. 13k) Repeat step i.

Figure 13L:
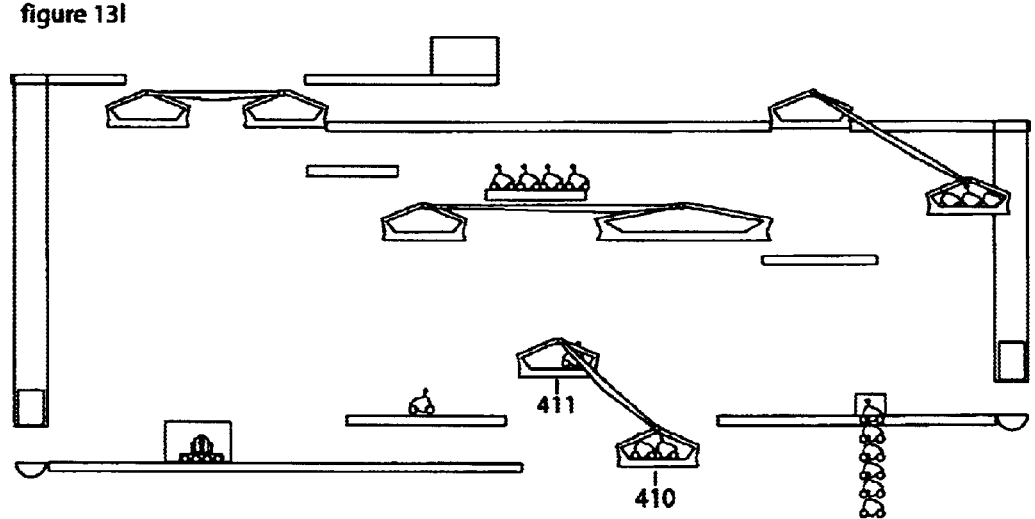

(FIG. 13l) Repeat step h. There are now two counterweights on lever platform 410, with one counterweight on lever platform 411.

Figure 13M:
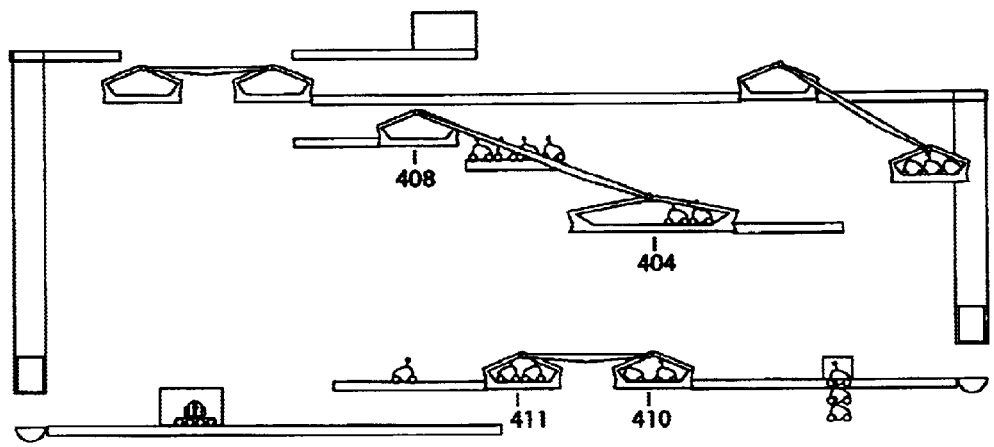

(FIG. 13m) Repeat steps a through all but the last step of g. Remove the counterweight from lever platform 408 to lever platform 411 so that lever platform 408 returns to its highest position, lever 404 returns to its lowest position (weighed down by two counterweights), and levers 410 and 411 return to their middle positions.

Figure 13N:
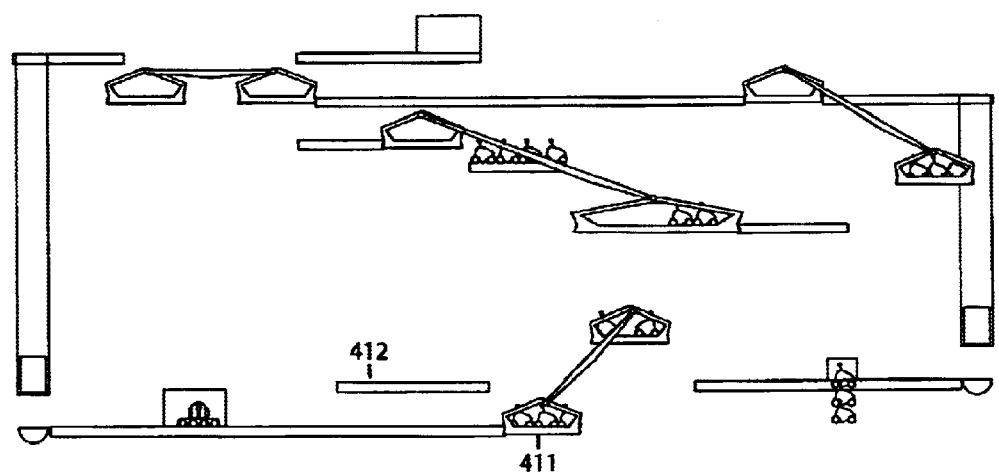

(FIG. 13n) Move the counterweight from platform 412 to lever platform 411 so that lever platform 411 falls to its lowest position.

Figure 13O:
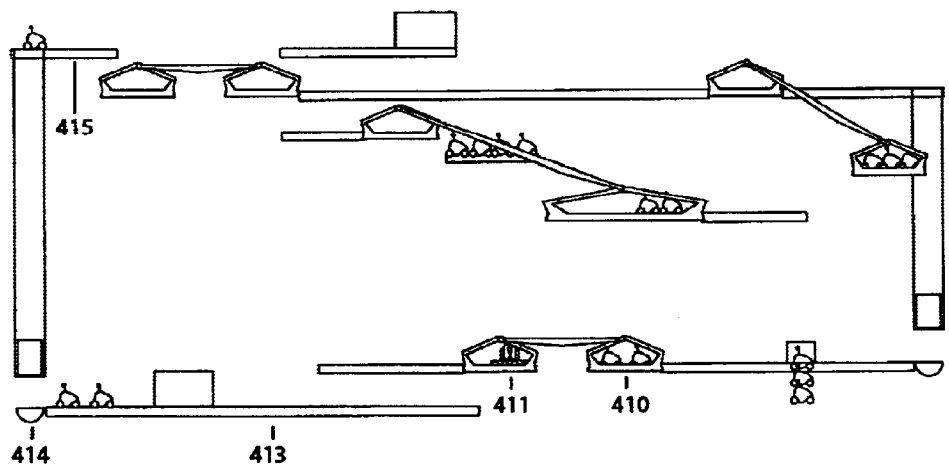

(FIG. 13o) Move the primary object from platform 413 to lever platform 411, then move the three counterweights from lever platform 411 to platform 413 (they are now free to move to elevator platform 414 from which they reach platform 415). Lever platform 411 returns to its middle position with the primary object (its mass perfectly balances the two counterweights on lever platform 410).

Figure 13P:
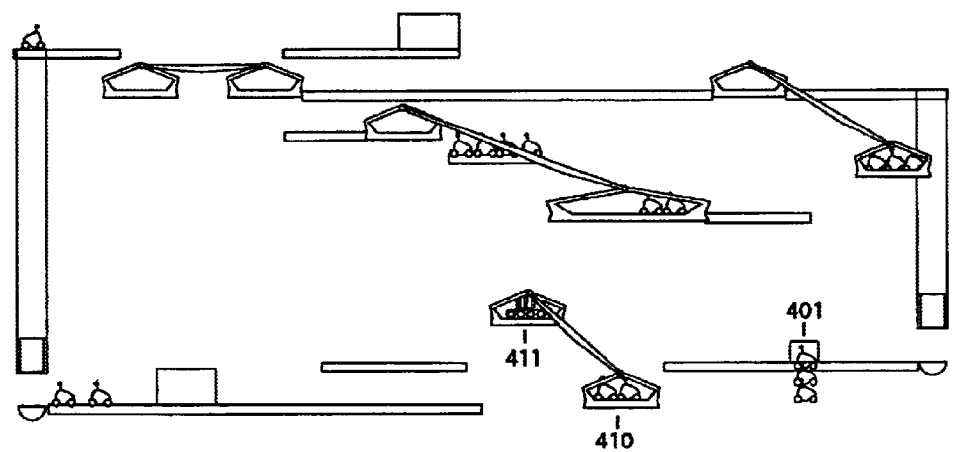

(FIG. 13p) Repeat step h.

Figure 13Q:
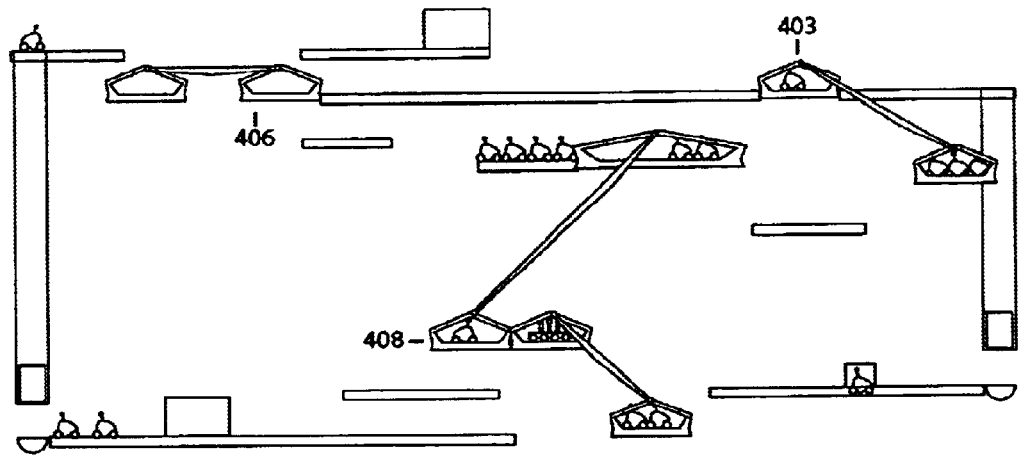

(FIG. 13q) Dispense a counterweight. move it up the elevator at right, all the way across the top to lever platform 406 and finally to lever platform 408 so that lever platform 408 falls to its lowest position. Dispense another counterweight, move it up the elevator at right and then left to lever platform 403.

Figure 13R:
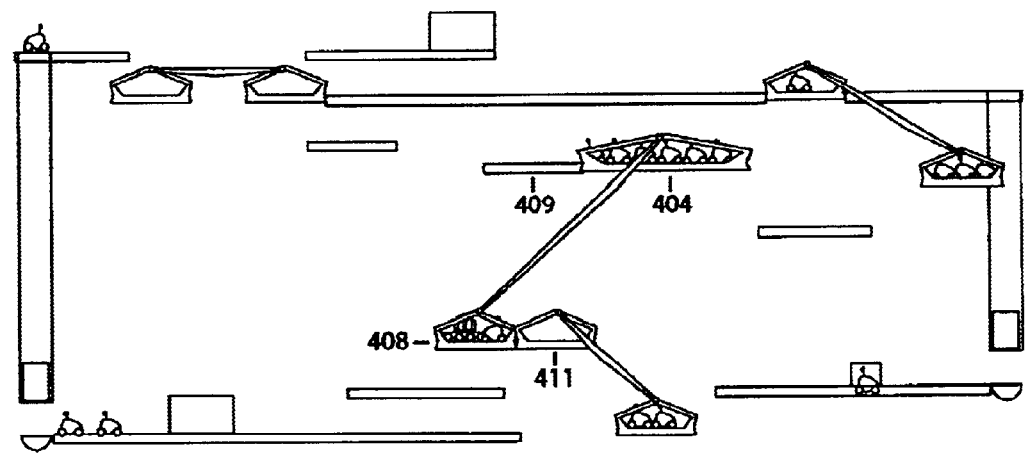

(FIG. 13r) Remove the primary object from lever platform 411 to lever platform 408. (note: the combined torque of the counterweight and the primary object on lever platform 408 would perfectly balance nine counterweights on lever platform 404 since the arm lengths are in a 3:1 ratio.) Remove the four counterweights from platform 409 to lever platform 404, giving a total of six counterweights on lever platform 404.

Figure 13S:
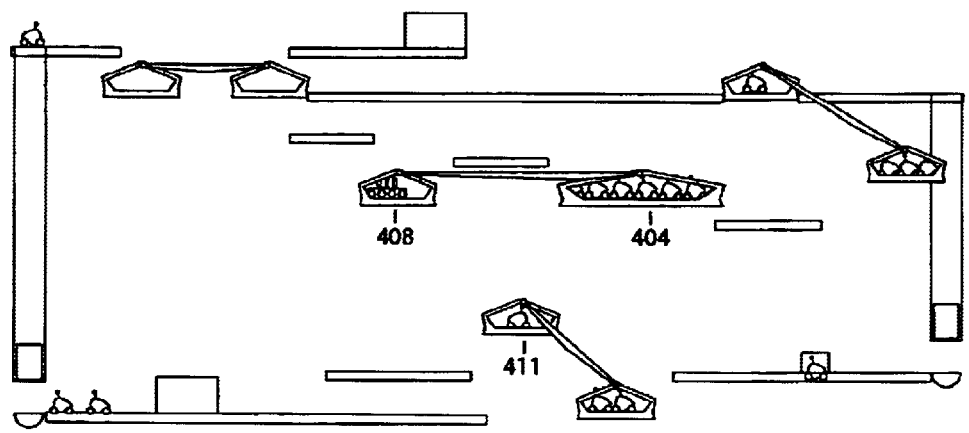

(FIG. 13s) Remove the counterweight from lever platform 408 to lever platform 411. The primary object now perfectly balances the six counterweights on lever platform 404, so lever platforms 408 and 404 return to their middle positions.

Figure 13T:
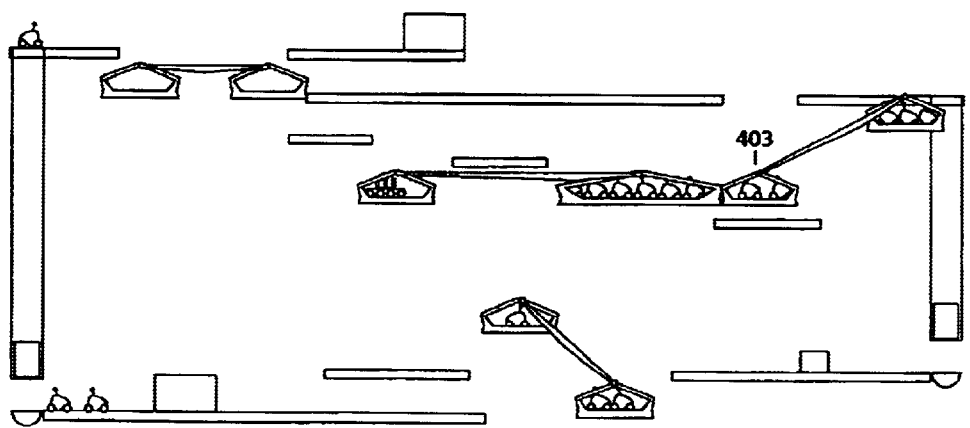

(FIG. 13t) Dispense another counterweight, move it up the elevator at right and then left to lever platform 403. Lever platform 403 falls to its lowest position.

Figure 13U:
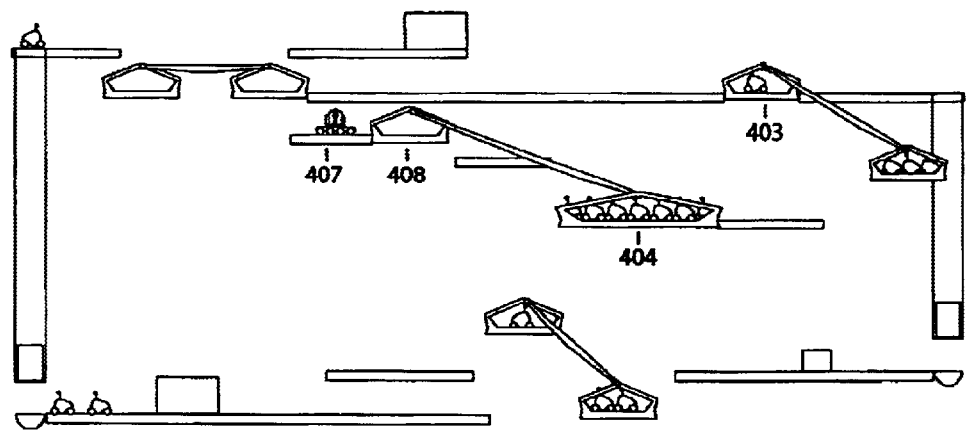

(FIG. 13u) Move one counterweight from lever platform 403 to lever platform 404. Lever platform 408 rises to its highest position, allowing the primary object to be removed to platform 407. Lever platform 403 also returns to its highest position.

Figure 13V:
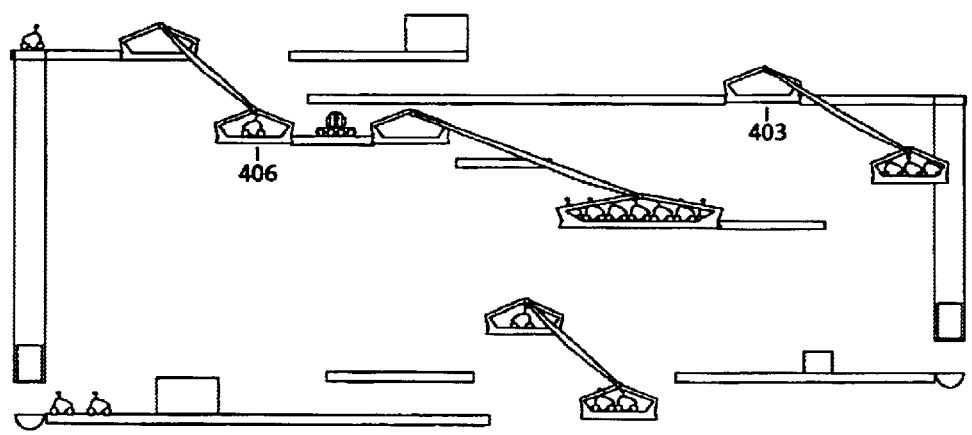

(FIG. 13v) Move the counterweight from lever platform 403 all the way left to lever platform 406 so that lever platform 406 falls to its lowest position.

Figure 13W:
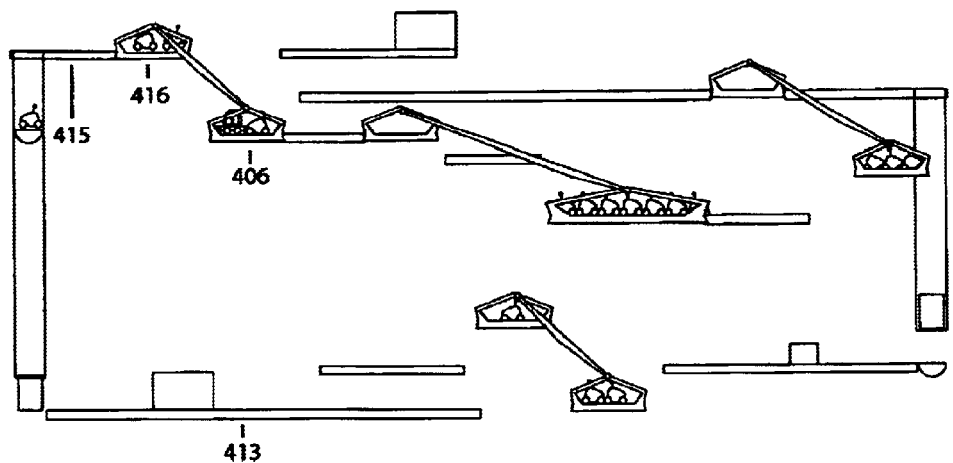

(FIG. 13w) Load the primary object onto lever platform 406. Move any counterweights remaining on platform 413 up the elevator to platform 415 and subsequently to lever platform 416.

Figure 13X:
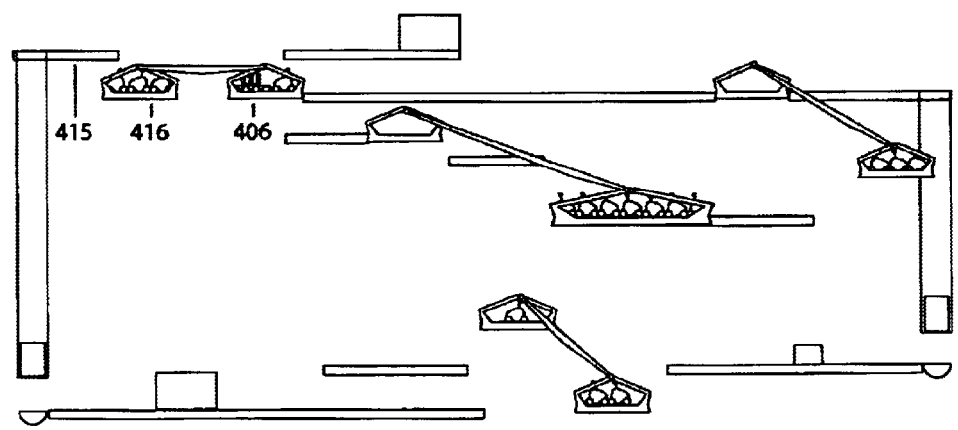

(FIG. 13x) When all three counterweights have been removed from platform 415 to lever platform 416, the three counterweights on lever platform 416 perfectly balance the counterweight and primary object on lever platform 406.

Figure 13Y:
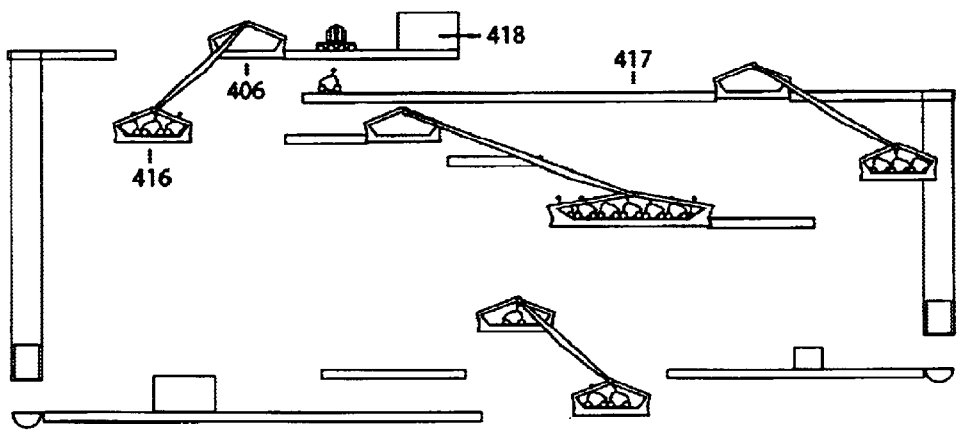

(FIG. 13y) Remove the counterweight from lever platform 406 to platform 417 so that lever platform 406 rises to its highest position and gives the primary object access to the goal (418).

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A game, comprising:
(a) a movable object,
(b) an initial location,
(c) a destination,
(d) a plurality of platforms and levers between the initial location and the destination; and
(e) counterweights movable onto the lever platforms to balance the weight of the movable object
wherein the object of the game is to move the movable object from the initial location to the destination by means of the platforms and the levers.

2. The game of claim 1, wherein the levers further comprise a first arm, a second arm, a fulcrum between the first arm and the second arm, and lever platforms at the ends of the first arm and second arm distal from the fulcrum, the lever platforms receiving the movable object.

3. The game of claim 2, having different ratios between the lengths of the first arm and the second arm.

4. The game of claim 3, wherein the ratio is a ratio of two integers.

5. The game of claim 4, wherein the lever platforms pivot on the fulcrum to move adjacent the platforms.

6. The game of claim 1, wherein each counterweight has a mass one-half that of the movable object.

7. The game of claim 6, further comprising an elevator for moving the counterweights between the initial location and the destination.

8. The game of claim 7, wherein the game is mechanical, the initial location, destination, and platforms being three-dimensional objects fixed to a vertical grid and the levers, elevator, movable object and counterweights being three-dimensional objects movable in two dimensions on the grid.

9. The game of claim 8, wherein the game is electrified, further comprising a source of electric current, electrical conductors between the source of electric current and the platforms, elevator, and levers, contacts on the platforms, elevator and levers connected to the electrical conductors, contacts on the movable object making electrical contact with the contacts on the platforms and levers, contacts on the counterweights making electrical contact with the platforms, elevators, and levers, and electric motors on the movable object and on the counterweights energized by the source of electric current to move the movable object among the platforms and levers and to move the counterweights among the platforms, elevator, and levers.

10. The game of claim 9, wherein there are multiple movable objects, and further comprising logic for selecting one of the multiple movable objects to receive electric current from the source of electric current.

11. The game of claim 10, further comprising logic for selecting a counterweight to receive electric current from the source of electric current.

12. The game of claim 11, further comprising a game control panel, the game control panel having a selector and a joystick, the selector connecting the source of electric current to the movable object and counterweights and the joystick changing the polarity of the source of electric current applied to the movable object and counterweights, thereby causing the electric motor to move the movable object and counterweights in one of two directions.

13. The game of claim 7, wherein the game is electronic, the initial location, destination, and platforms being two-dimensional graphic objects displayed fixedly on a display means, and the levers, elevator, movable object and counterweights being two-dimensional graphic objects displayable at various points on the display means, and further comprising a processor executing a computer program to cause the movable object and counterweights to be displayed adjacent the initial location, levers, platforms, and destination.

14. A game, comprising:
(a) a movable object,
(b) an initial location,
(c) a destination,
(d) a plurality of platforms and levers between the initial location and the destination, wherein the levers further comprise a first arm, a second arm, a fulcrum between the first arm and the second arm, and lever platforms at the ends of the first arm and second arm distal from the fulcrum, the lever platforms receiving the movable object, and
(e) counterweights movable onto the lever platforms to balance the weight of the movable object,
wherein the object of the game is to move the movable object from the initial location to the destination by means of the platforms and the levers.

15. The game of claim 14, wherein the ratio of the length of the first arm to the length of the second arm is variable.

16. The game of claim 15, wherein the ratio is a ratio of two integers.

17. The game of claim 16, wherein the lever platforms pivot on the fulcrum to move adjacent the platforms.

18. The game of claim 14, wherein each counterweight has a mass one-half that of the movable object.

19. The game of claim 14, further comprising an elevator for moving the counterweights between the initial location and the destination.

20. The game of claim 14, wherein the game is mechanical, the initial location, destination, and platforms being three-dimensional objects fixed to a vertical grid and the levers, elevator, movable object and counterweights being three-dimensional objects movable in two dimensions on the grid.

21. The game of claim 20, wherein the game is electrified, further comprising a source of electric current, electrical conductors between the source of electric current and the platforms, elevator, and levers, contacts on the platforms, elevator and levers connected to the electrical conductors, contacts on the movable object making electrical contact with the contacts on the platforms and levers, contacts on the counterweights making electrical contact with the platforms, elevators, and levers, and electric motors on the movable object and on the counterweights energized by the source of electric current to move the movable object among the platforms and levers and to move the counterweights among the platforms, elevator, and levers.

22. The game of claim 21, wherein there are multiple movable objects, and further comprising logic for selecting one of the multiple movable objects to receive electric current from the source of electric current.

23. The game of claim 22, further comprising logic for selecting a counterweight to receive electric current from the source of electric current.

24. The game of claim 23, further comprising a game control panel, the game control panel having a selector and a joystick, the selector connecting the source of electric current to the movable object and counterweights and the joystick changing the polarity of the source of electric current applied to the movable object and counterweights, thereby causing the electric motor to move the movable object and counterweights in one of two directions.

25. The game of claim 14, wherein the game is electronic, the initial location, destination, and platforms being two-dimensional graphic objects displayed fixedly on a display means, and the levers, elevator, movable object and counterweights being two-dimensional graphic objects displayable at various points on the display means, and further comprising a processor executing a computer program to cause the movable object and counterweights to be displayed adjacent the initial location, levers, platforms, and destination.

* * * * *